United States Patent

Moriya et al.

[11] Patent Number: 5,867,475
[45] Date of Patent: Feb. 2, 1999

[54] OPTICAL RECORD CARRIER AND METHOD FOR RECORDING AND REPRODUCING SIGNALS THEREFROM

[75] Inventors: Mitsurou Moriya, Ikoma; Shin-ichi Tanaka, Kyoto; Koichi Hirayama, Yokohama, all of Japan

[73] Assignees: Matsushita Electric Industrial Co., Ltd., Kadoma; Kabushiki Kaisha Toshiba, Kawasaki, both of Japan

[21] Appl. No.: 16,631

[22] Filed: Jan. 30, 1998

Related U.S. Application Data

[63] Continuation of Ser. No. 627,008, Apr. 3, 1996, Pat. No. 5,732,066.

[30] Foreign Application Priority Data

Oct. 4, 1995 [JP] Japan ................................. 7-083982

[51] Int. Cl.⁶ .................................................. G11B 7/00
[52] U.S. Cl. ........................ 369/275.3; 369/59; 369/58
[58] Field of Search ................................. 369/59, 47, 48, 369/49, 50, 54, 58, 32, 275.1, 275.2, 275.3

[56] References Cited

U.S. PATENT DOCUMENTS 3,876,842   4/1975  Bouwhuis .
4,057,833   11/1977  Braat et al. .
4,740,940   4/1988  Tanaka et al. .
5,541,960   7/1996  Satomura et al. ........................ 369/59

FOREIGN PATENT DOCUMENTS 0580876   2/1994  European Pat. Off. .
0655793   5/1995  European Pat. Off. .
0686968   12/1995  European Pat. Off. .

*Primary Examiner*—Muhammad N. Edun
*Attorney, Agent, or Firm*—Greenblum & Bernstein, P.L.C.

[57] ABSTRACT

An optical record carrier and methods and apparatuses for recording and reproducing an information on and from said optical recording carrier, whereby the effects of crosstalk from adjacent tracks is reduced, and stable tracing control is possible, is achieved. A recording track to which information divided into sector units is recorded is formed in a spiral or concentric pattern on the surface of the optical record carrier. Each sector further comprises sixty frames. Each frame comprises a re-sync pattern, frame address, data, and postamble fields. Identification information identifying the sector location of the information is recorded to the data block of the first frame. The user data is recorded after the data is scrambled using a value generated by a fifteen-stage maximum-length sequence generator based on the value of this identification information. The correlation between signals on adjacent tracks is thus reduced, and the effects of crosstalk are randomized, thus reducing the effect on the track error signal and enabling extremely stable tracking control.

29 Claims, 15 Drawing Sheets

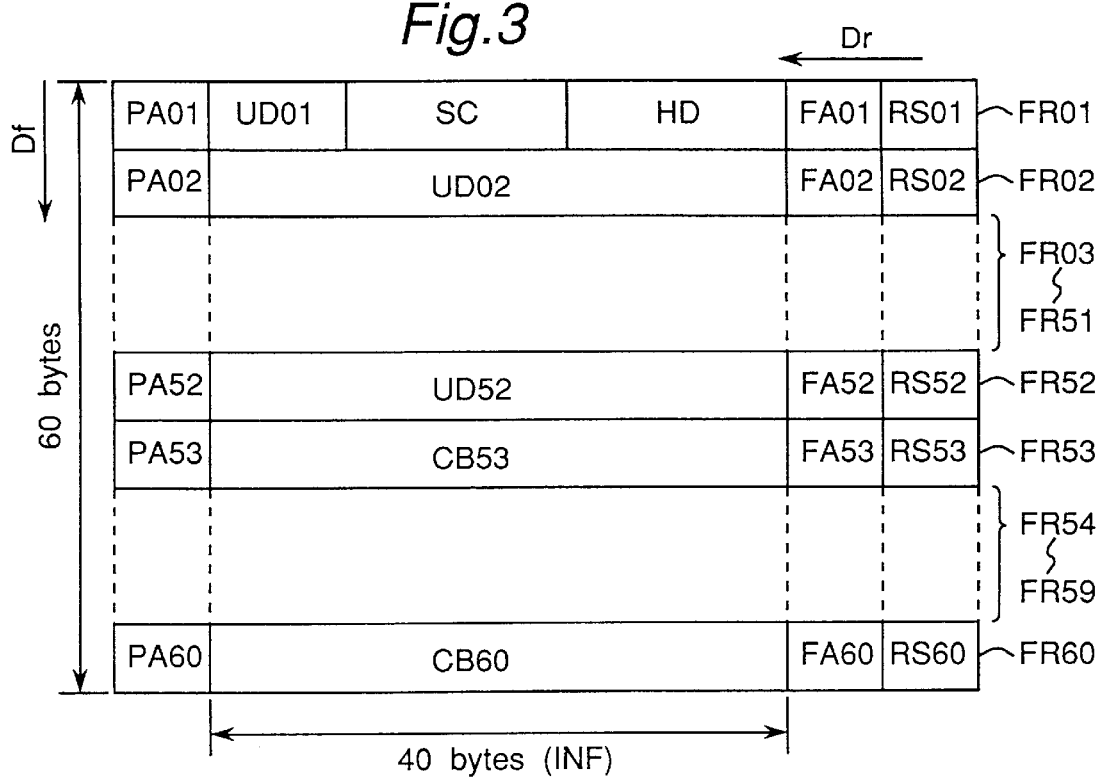
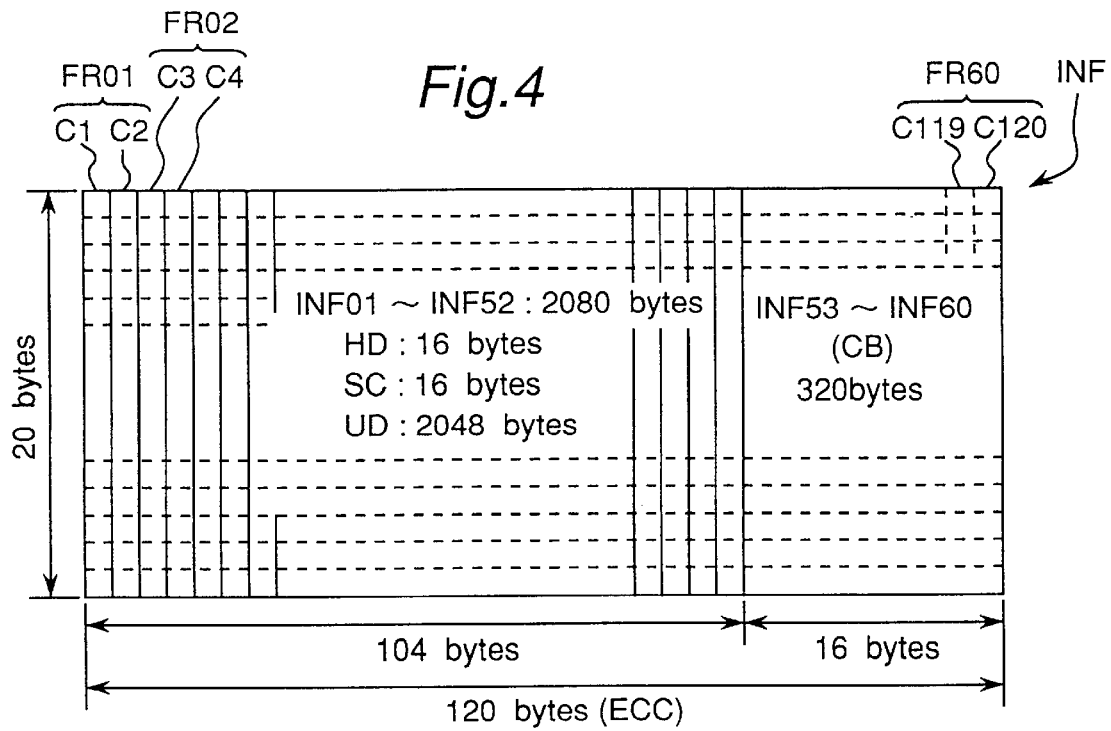

OPTICAL RECORD CARRIER AND METHOD FOR RECORDING AND REPRODUCING SIGNALS THEREFROM

This application is a continuation of application Ser. No. 08/627,008, filed Apr. 3, 1996, now U.S. Pat. No. 5,732,066, the contents of which are herein incorporated by reference in its entirety.

TECHNICAL FIELD

The present invention relates to an optical record carrier from which information is read by emitting a focused optical beam thereon, and to a method for recording signals thereon and reproducing recorded signals therefrom.

BACKGROUND ART

Read-only optical record carriers (hereafter "record carriers") have become increasingly important as a storage medium for audio information data, video information data, and other data types because of the capacity to store large volumes of information for later reproduction. Demand for ever-larger storage capacities and smaller device size continues to rise, however, making it necessary to further increase the data recording density of the record carrier.

Conventional record carriers of this type are disc-shaped recording medium with a resin substrate to the surface of which are formed spiral or concentric data tracks of pits and lands. A reflective film of, for example, aluminum, is then formed by sputtering or another process on the data carrier surface of the substrate.

When data is reproduced from this record carrier, an optical beam emitted from a semiconductor laser is focused on the record carrier, and the laser beam is controlled to follow the data tracks of the record carrier by detecting the reflected beam. The recorded information is read by detecting the change in the reflected light quantity resulting from the pits and lands on the record carrier.

The phase difference methods described in U.S. Pat. No. 4,057,833 which was issued to Josephus et al. on Nov. 8, 1977 and U.S. Pat. No. 4,740,940 which was issued to Tanaka et al. on Apr. 26, 1988 have been used to detect the control signal for tracking control, i.e., a track error signal corresponding to the offset, or positional error, between the positions of the optical beam and the actual track on the record carrier.

This phase difference method uses a photo detector dividing the reflections from the record carrier into quadrants in the track length and width directions of the detection surface, and determines any track error based on the phase difference of the sum signals outputted by detectors at diagonally opposite positions.

A three-beam method has also been described in U.S. Pat. No. 3,876,842 issued to Gijsbertus on Apr. 8, 1975. This method emits three optical beams, the read beam and two complementary beams, to the record carrier, detects each reflected beam using a discrete photo detector, and detects the track error based on the light quantity, or the light density, difference of the complementary reflected beams.

The data recording density of the above record carrier is determined by the data track pitch and the data density in the track direction, i.e., the linear density of the recorded data. However, as the track pitch is decreased, crosstalk from adjacent tracks increases. When there is a strong correlation between data recorded on adjacent tracks, pseudo signals are generated in the track error signal, and tracking control is not stable. These phenomena under the phase difference method are described below with reference to FIGS. 16 and 17.

In FIG. 16, an example of a photo detector 104e used for receiving an optical beam that is preferably a laser beam reflected from the record carrier to detect the focus error signal, the tracking error signal, and the information signal is shown. The photo detector 104e is preferably constructed by four square cells C1, C2, C3, and C4, each cell is close to two other cells by two neighboring side edges, as shown in FIG. 16. Each of square cells C1, C2, C3, and C4 generates pilot signals Sc1, Sc2, Sc3, and Sc4, respectively, according to the area of laser spot focused thereon.

The tracking control of the laser beam is performed by utilizing these pilot signals Sc1, Sc2, Sc3, and Sc4 as follows. The pilot signals Sc1 and Sc4 produced from the cells C1 and C4 located in a diagonal position are summed to produce a first sub tracking signal ST1. Similarly, the pilot signals Sc2 and Sc3 produced from the cells C3 and C2 located in another diagonal position are summed to produce a second sub tracking signal ST2. According to the difference between two sub track signals ST1 and ST2, the laser beam Ls is tracked.

In FIG. 17, a plurality of pits P each having a simple spatial frequency are recorded on plural tracks Tr1, Tr2, and Tr3 along the center lines thereof are shown. A spot of the leaser beam Ls is positioned to scan the pits along the center line of track Tr2, and the laser beam reflected from thus scanned the track Tr2 is received by the photo detector 104e of FIG. 16.

The solid lines L1 and L2 indicate the first and second sub tracking signals ST1 and ST2, respectively, in an ideal condition where the scanned track Tr2 is free from any interference such as crosstalk from the neighboring tracks Tr1 and Tr3. The dotted lines L1$d$ and L2D indicates the first and second sub tracking signals ST1 and ST2, respectively, in an actual condition where there are interferences between the tracks Tr1, Tr2, and Tr3.

Under the ideal conditions, the phases of both the sub tracking signals ST1 and ST2 are identical to those of pits P formed on the scanning track Tr2, as specifically indicated by solid lines L1 and L2. However, the pits existing on the neighboring tracks causes the pilot signals Sc1, Sc2, Sc3, and Sc4 reproduced from the scanned track Tr2 to have crosstalk with sub signals reproduced from the neighboring tracks Tr1 and Tr3.

This crosstalk in pilot signals Sc1, Sc2, Sc3, and Sc4 affects the phases of sub tracking signal ST1 and ST2 that are summation of a diagonal pair thereof. Specifically, one of sub tracking signal ST1 and ST2 is shifted forward, and the other is shifted backward with respect to a chronological order when the data recorded on the neighboring tracks have strong correlations therebetween. In this example, the first sub tracking signal ST1 is advanced by a period $\Delta ta$, and the second sub tracking signal ST2 is delayed by a period $\Delta td$, respectively.

Closer track pitch causes the greater crosstalk between neighboring tracks. Furthermore, when the data having the same or similar pattern are recorded on the neighboring tracks with the closer track pitch, the correlation between the neighboring tracks is great enough to increase the advanced period $\Delta ta$ or delaying period $\Delta td$ too much to perform the tracking the laser beam correctly according to the tracking signals ST1 and ST2.

Therefore, when the pits on one neighboring track, for example, Tr1 are located on advanced position to those on the currently scanning track Tr2, the correlation between these tracks Tr1 and Tr2 acts the signal reproduced from the current track Tr2 to advance. On the other hand, when the pits on the other neighboring track Tr3 are located on delayed position to those on the currently scanning track Tr2, the correlation between these tracks Tr2 and T3 acts the reproduced signal to delay.

In other words, when pits having a simple spatial frequency are recorded across plural tracks, the signal correlation between the signal from the track to which the optical beam is positioned is strong; and the signals from the adjacent tracks are also extremely strong. Crosstalk from these adjacent tracks thus disrupts the track error signal, resulting in unstable tracking control.

When digital images are recorded to such a record carrier, still images may obviously also be recorded. Though it is not a problem with moving images, signals with a strong correlation may be recorded across plural tracks in still image recordings, and tracking control becomes unstable in those tracks. A control data area is also provided across plural tracks at either the outside or inside circumference area of the disk for recording the control data when computer data is recorded. However, this control data area is not always fully recorded with the control data, and the blank (unrecorded) regions thereof is recorded with dummy data, such as "FF" in hexadecimal code.

The tracking control band is usually several kilohertzes wide, and tracking control is disrupted if signal bands having a strong correlation are present in this control band. For example, if the record carrier rotates at 1800 rpm, tracking control will be disrupted by a strong inter-track signal correlation only several millimeters long at a 35 mm radial position.

Although the uniform data pattern and the narrow pitched tracks contributing to the strong correlation and crosstalk between neighboring tracks are described with respect to the tracking control, this goes for the focus control and the data reproduction operations.

DISCLOSURE OF THE INVENTION

The object of the present invention is therefore to provide an optical record carrier which solves these problems.

The present invention has been developed with a view to substantially solving the above described disadvantages and has for its essential object to provide an improved optical record carrier.

In order to achieve the aforementioned objective, an optical record carrier for recording an information thereon comprises a recording track formed thereon in either of a spiral and a concentric pattern; and a plurality of sectors formed on said recording track each for recording said information and a sector information identifying location of said recorded sector, wherein said information is recorded after being randomized using a value generated by a maximum-length sequence generation method with a predetermined stage number of stages with respect to an initial value which is renewed at least one time per a round of said recording track.

The present application is based upon Japanese Patent Application No. 7-83982, which was filed on Apr. 10, 1995, the entire content of which is expressly incorporated by reference herein.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3 is a graph schematically showing a sector layout in the data format of FIG. 2, FIG. 4 is a sequence diagram schematically showing an arrangement of data prepared for recording on the sector of FIG. 3, FIG. 5, a block diagram showing a recording apparatus according to the present invention for recording the randomized data on the optical disk of FIG. 1.

BEST MODE FOR CARRYING OUT THE INVENTION

Figure 1:
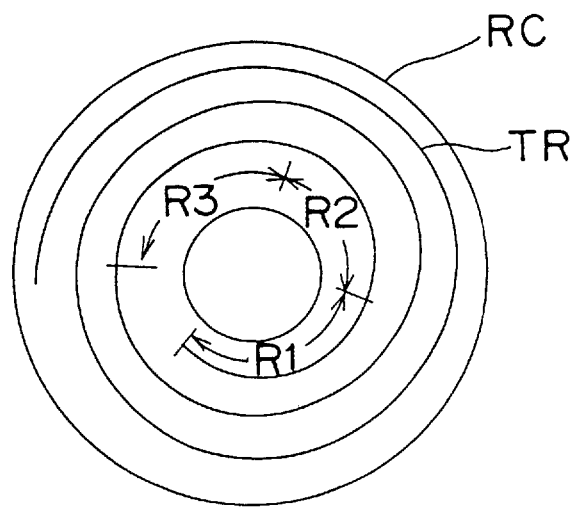
FIG. 1 is a plan view schematically showing one example of a record carrier according to the present invention.

Referring to FIG. 1, a recording surface of an optical disk, an example of a recording carrier, according to the present invention is shown. The optical disk RC has preferably a single recording track TR for bearing data thereon provided on one recording surface. The track TR to which data is recorded as a series of pits and lands on the disk-shaped record carrier RC is disposed in a spiral pattern in this embodiment.

Note that the portions of spirally patterned track TR are locate adjacent to the other. In this view points, these adjacent, or neighboring, portion of the track TR are treated as plural tracks for the better recognition.

Data is recorded at a constant linear velocity (CLV) to maintain a uniform data density per unit length of the track TR, i.e., linear data density, irrespective of the radial position on the record carrier RC. The recording track TR can be separated in discrete regions R1, R2, R3, . . . , each having the same number of recording sectors, which will be described later with reference to FIG. 8.

Figure 2:
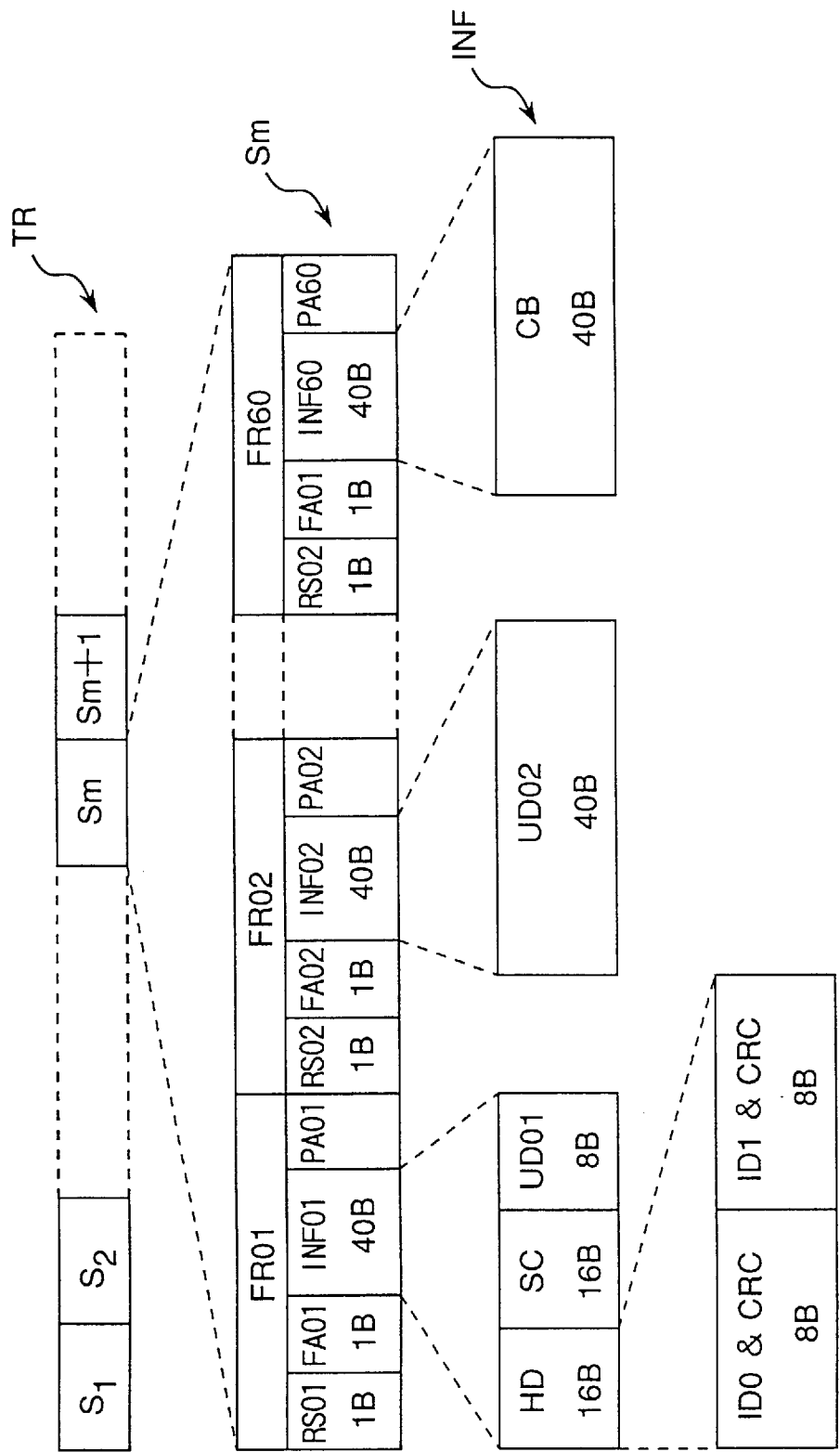
FIG. 2 is a diagram schematically showing a format of data receded to a record track formed on the record carrier of FIG. 1.

Referring to FIG. 2, a format diagram of the information recorded on the record carrier RC of FIG. 1 is shown. This record carrier RC is The track TR is formatted with a plurality of sectors S recorded continuously throughout the track TR. These sectors S are continuous and sequentially numbered sectors as S1, S2, S3. . . . , Sm, Sm+1, . . . , wherein "m" is an integer, and a predetermined number of sectors are included in the record track TR.

Each data sector Sm comprises sixty frames FR01 to FR60. Each of frames FR01 to FR60 comprises a re-sync pattern field RSf for frame synchronization during reproduction; a frame address filed FAf for identifying the frame location; a frame data field INFf; and a postamble field PAf. The suffix "f" after each of the above described symbols "FR", "RS", "FA", "INF", and "PA" indicates the corresponding frame number, and is an integer within a range from 1 to 60 in this example.

The re-syn pattern field RSf and the frame address field FAf are each one byte long converted to one frame data field INFf equivalent. The frame data field INFf has a capacity of 40 bytes. The postamble field PAf may comprise plural pits, but one or two pits is sufficient For example, when data is coded with run-length limited (RLL) (1, 7) modulation (a modulation technique converting eight bits of data to twelve channel bits), the length of the pits or the spacing between the pits (or the lands) ranges from 2 T to 11 T where T is the channel clock. The postamble field PAf needs only a pair of 2 T-long pits and lands. The postamble field PAf may also be omitted as required because its primary purpose is to facilitate reading the frame data block INFf.

The pattern recorded to the re-sync pattern field RSf is a pattern that does not appear in the other fields. If RLL (1, 7) coding is used as in the above example, the re-sync pattern field RSf may be predefined to have lands 12 T or longer in length.

The first frame data field INF01 of the first frame FR01 is formatted in a predetermined pattern different from those of other frame data fields INF02 to INF60 of the remaining frames FR02 to FR60, as described below. The frame data field INF01 of the first frame FR01 starts with a 16-byte header HD identifying the sector address SA, a 16-byte subcode recording management information SC, and 8 bytes of a first user data UD01.

The header HD records the address ID0 (ID1) and CRC twice, i.e., twice records the sector number, indicating the corresponding sector Sm, assigned sequentially from the inside circumference to the outside circumference of the track TR. However, each of frame data fields INF02 to INF52 of the frames FR02 to FR52 is occupied only by a user data UDf having 40 bytes, wherein no header HD or subcode SC is included. Furthermore, each of frame data fields INF53 to INF60 of the remaining frames FR53 to FR60 is occupied only by an error correction coded (ECC) check byte (CB) having 40 bytes.

Referring to FIG. 3, a data layout of the sector Sm recorded on the optical disk RC is shown. Each of rows represents a data format of a single frame FRf, and is recorded on the record carrier RC in the sequence indicated by an arrow Dr, frame by frame in a direction indicated by arrow Df. Each frame RFf is recorded with the re-sync pattern data block (RSf), the frame address data block (FAf), the frame data block (INFf), and the postamble data block (PAf).

Specifically, for the first frame FR01, the frame data field INF01 is recorded with the 16 bytes of header data block (HD), the 16 bytes of subcode data block (SC), and the 8 bytes of first user data block (UD01).

For the frames FR02 to FR52, the frame data field INF02 to INF52 are recorded only with the 40 bytes of user data blocks (UD02 to UD52), respectively.

For the frames FR53 to FR60, the frame data fields INF53 to INF60 are recorded only with the 40 bytes of error correction code check byte blocks CB53 to CB60, respectively.

Therefore, each sector Sm includes 2400 bytes of frame data blocks (INF01 to INF60) comprised of 16 bytes of header block (HD), 16 bytes of subcode block (SC), 2048 bytes of user data blocks (UD01 to UD52), and 320 bytes of error correction code check byte blocks (CB53 to CB60). The 2080 bytes of the first fifty two frame data blocks INF01 to INF52, including header HD, sub code SC, and user data blocks UD01 to UD52, is used to indicate and record the user's favorite information on the corresponding record sector Sm of the optical disk RC.

In other words, the 2048 bytes of the first fifty two frame data blocks (INF01 to INF52) not including the first 32 bytes of the first frame data block (INF01) are the user's own favorite data which are recorded to the user data blocks (UD01 to UD52). The first 32 bytes of the first frame data block (FR01) are used for the header HD and subcode SC. The header HD is used to indicated the address such as sector number. The subcode SC is used to indicate the type of the optical disk from which the information is produced, the type of the user data, and so on. In this view point, these 2080-byte data of the first fifty-two frame data blocks (INF01 to INF52) are referred to as "an information data."

The 320-byte data of the following frame data blocks (IFN53 to INF60) are "error correction code (ECC) check byte (CB)" used to check the accuracy of the information data and to correct the information data when any error is found. The data of frame data blocks INF01 to INF60 are scrambled to randomize the data therein in various method, according to the present invention, so as to reduce the correlation of data between neighboring record tracks TR, or sectors Sm. This randomization process will be described in detail later with reference to FIGS. 7 and 8. Note that, hereinafter, the same symbols of Sm, FRf, RSf, PAf, INFf, PAf, HD, SC, UDf, CBf are used to indicate both of the fields formed on the record carrier RC and the data blocks recorded to the corresponding recording fields.

Referring to FIG. 4, an arrangement pattern of the data for recording to the frame data fields INFf of sector Sm is shown schematically. The information data of 2080 bytes are arrayed 104 bytes per row and 20 bytes per column. The 16 bytes of ECC check byte CB are added to each row. Thus, twenty rows of error correction codes (ECC) each having 120 bytes long, including 104 bytes of information byte and 16 bytes of check byte CB per row are prepared.

The total capacity of the frame data block INF in each sector Sm is thus 2400 bytes, including 2080 bytes of information data HD, SC, and UD and 320 bytes of check byte CB for error correction. This error correction method is known as a long distance code (LDC). The 32-bytes of header and subcode data HD and SC in the information data are arrayed to the first and second columns C1 and C2 starting from the top left in FIG. 4, with the 8-byte user data UD01 written to the last 8 bytes of the second column remaining. Thus, the 40 bytes date for recording the first frame data block INF01 are arranged in the first and second columns C1 and C2.

The data for the second frame data field INF02 are arranged in the third and fourth columns C3 and C4. Hereinafter, data for every frame data field INFf are arraigned in the following two mating columns starting odd column numbers. Thus, the data for recording all the frame data fields INF01 to INF60, including the user data UD01 to UD52 with the check byte CB53 to CB60, are prepared in the matrix of 20-byte lines by 120-byte columns.

First Embodiment

Figure 5:
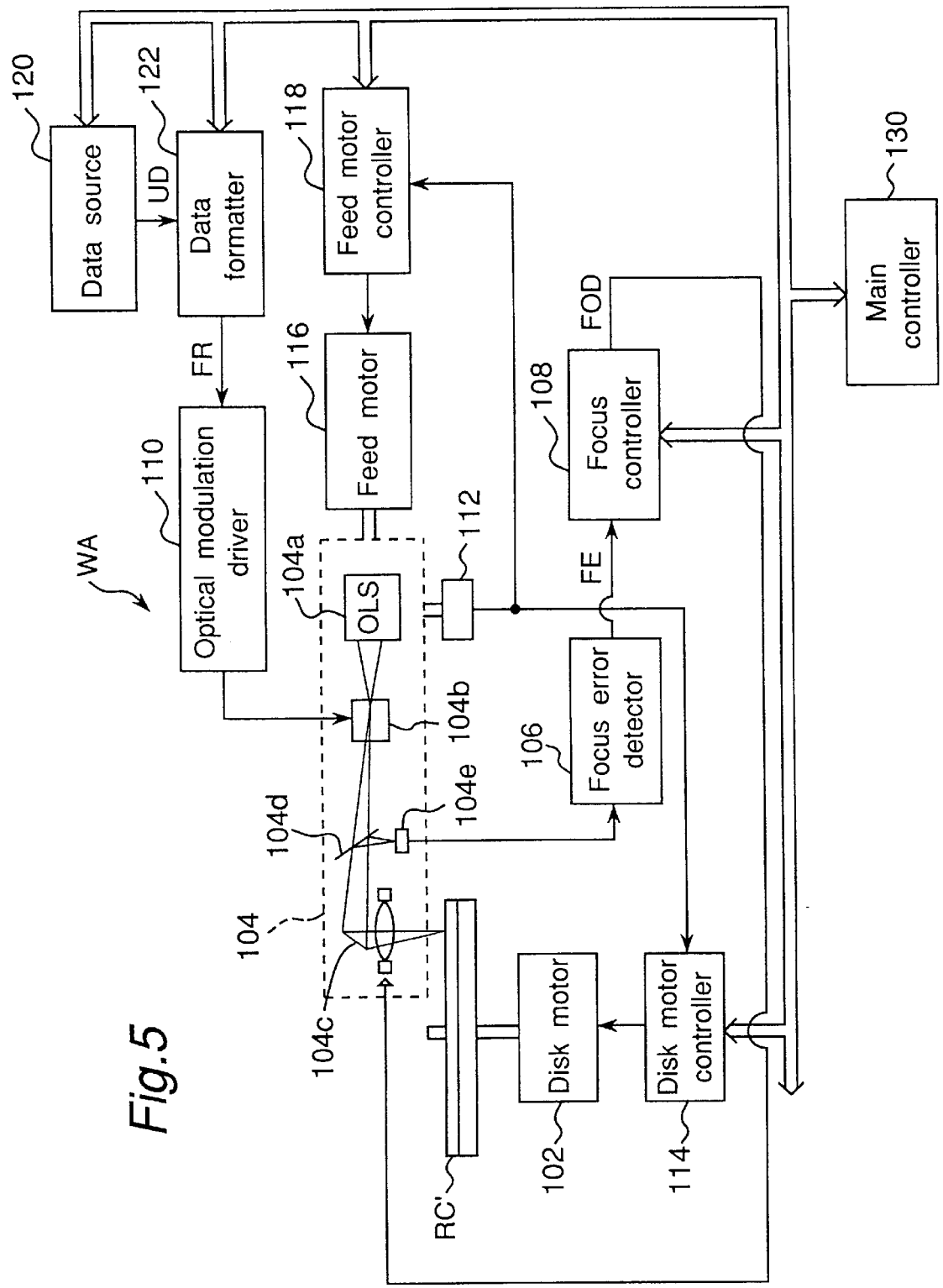

Referring to FIG. 5, a recording apparatus according to the present invention for recording the randomized data on the sector Sm of an optical disk RD' is shown. This optical disk RC' is an alternative of the optical disk RD of FIG. 1, and is a type of data writable (rewritable) media. The data format and track construction are substantially the same between these disks RD and RC'.

The recording apparatus WA includes a disk motor 102 for supporting and rotating the optical disk RC' of FIG. 1. An optical head 104 is provided for optically writing the data on the disk RC'. The optical head 104 has a light source 104a, an optical modulator 104b, a focusing unit 104c, a half mirror 104d, and a photo detector 104e.

The light source 104a emits a light beam Ls toward the optical disk RC' through the optical modulator 104b, the half mirror 104d, and the focusing unit 104c. The optical modulator 104b is driven by an optical modulator driver 110 for modulating the strength or emitting angle to prevent the light beam Ls having enough recording power from reaching the optical disk RC'. In this view, the modulator 104b functions as an ON/OFF switch of a source of light beam Ls.

Figure 16:
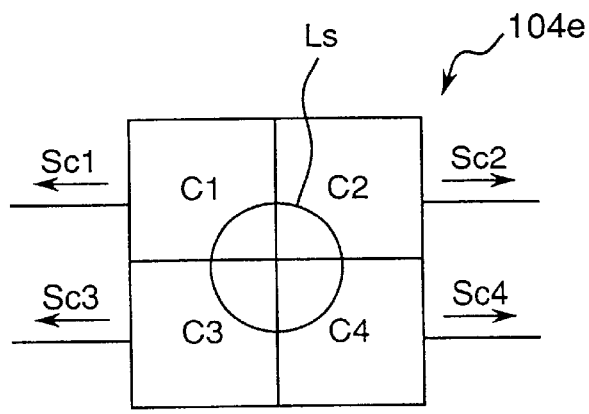
FIG. 16 is a plane view showing a photo detector for converting a optical beam reflected from the optical disk surface into electric pilot signals.
Figure 17:
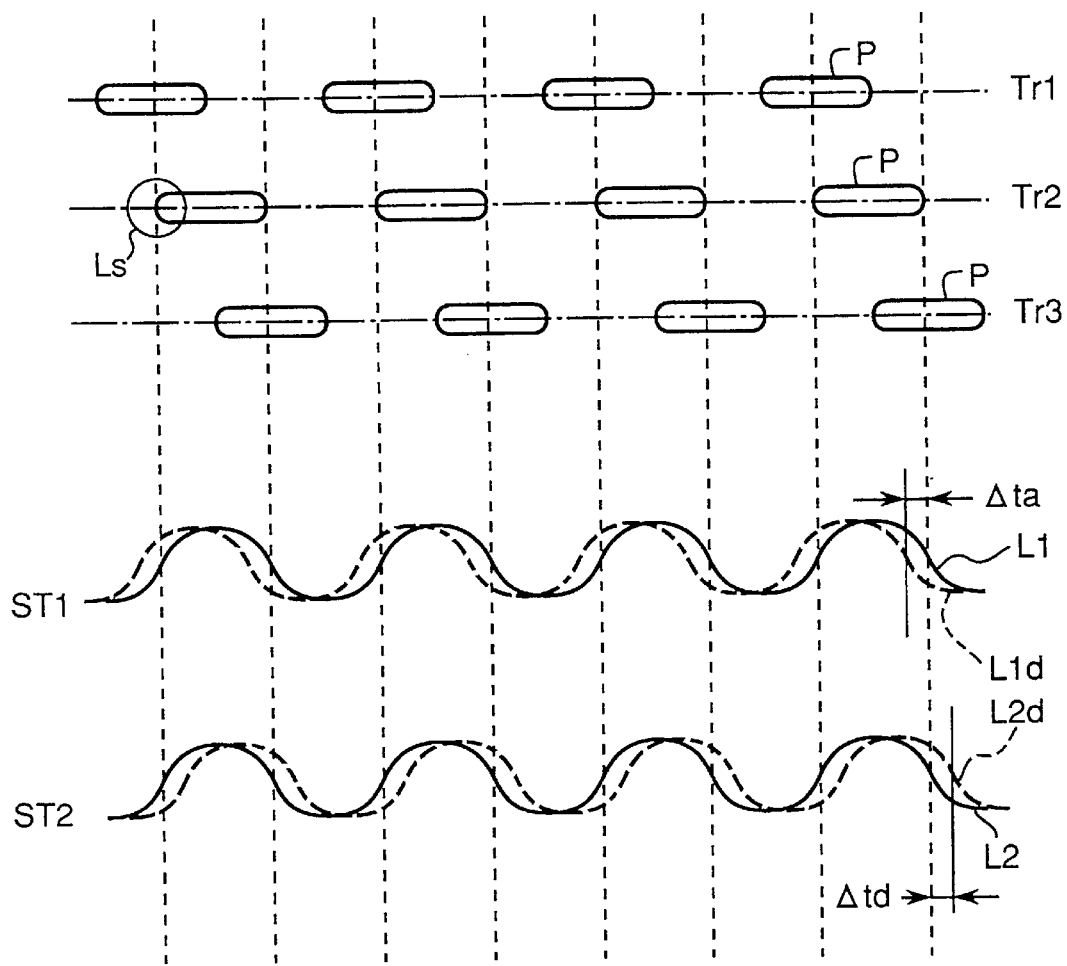
FIG. 17 is a graph in assistance of explaining a relationship between pit patterns and correlations of pilot signals of FIG. 16, FIGS. 18A, 18B, and 18C are graphs showing various types of record carrier applicable for the present invention.

The photo detector 104e receives the light beams Ls reflected from the optical disk RC' through the focusing unit 104c and the half mirror 104d. As described in the above with reference to FIG. 16, the photo detector 104e generates pilot signals Sc1, Sc2, Sc3, and Sc4, respectively, according to the spot area of light beam Ls focused on each of four cells C1, C2, C3, and C4.

A focus error detector 106 is connected to the photo detector 104e for receiving the pilot signals Sc1, Sc2, Sc3, and Sc4 to produce a focus error signal FE. A focus controller 108 is connected to the focus error detector 106 for receiving the focus error signal FE therefrom to produce a focus control signal FOD.

The focusing unit 104c of the optical head 104 is connected to the focus controller 108 for receiving the focus control signal therefrom to make the light beam Ls focused on the correct position.

A head position detector 112 is provided for detecting the position of the optical head 104 with respect to the radial direction of the optical disk RC' to produce head position signal. A disk motor controller 114 is connected to the head position detector 112 for receiving the head position signal, and is connected to the disk motor 102 for controlling the rotation thereof properly based on the position signal.

A feed motor controller 18 is connected to the head position detector 112 for receiving the head position signal therefrom, and is further connected to a feed motor 116 for controlling the velocity thereof properly based on the position signal.

A data source 120 such as an original source video tape recorder is provided for supplying an original information data, corresponding to the user data UD, to be recorded on the optical disk RC'. The data source 120 can be replaced by an input port for receiving the original source data from the externals.

A data formatter 122 is connected to the data source 120 for receiving the user data UD therefrom to process in the form of frame data INFf as being randomized for the reduced correlation between neighboring record tracks TR, or sectors Sm. The construction and operation of the data formatter 122 will be described soon later with reference to FIG. 6.

A main controller 130 preferably constructed by a micro processor is connected to the focus controller 108, the disk motor controller 114, the feed motor controller 118, the data source 120, and the formatter 122 by a bus for exchange various signals therebetween. It is needless to say that the main controller 130 is provided for the control of an entire operation of the recording apparatus including all components other than those specifically described in the above.

Figure 6:
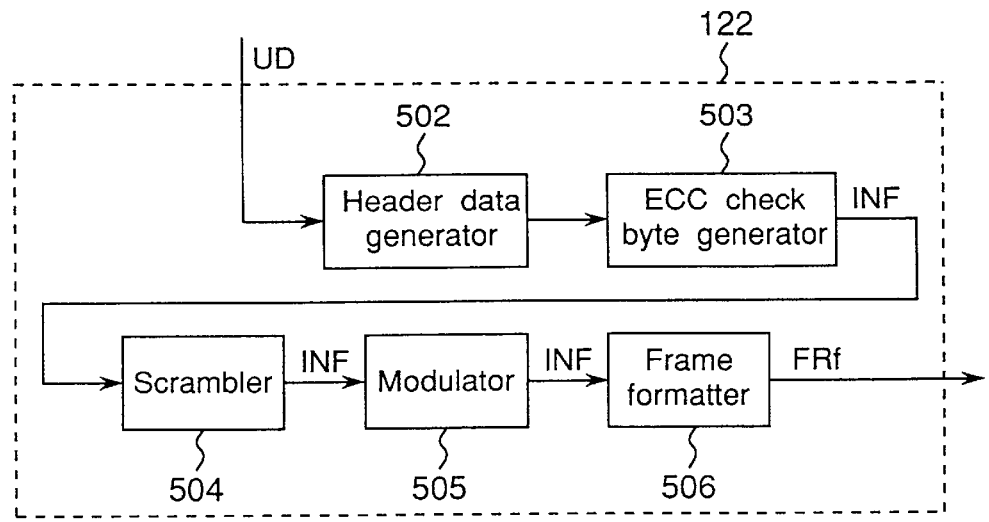
FIG. 6 is a block diagram showing the data formatter of FIG. 5.

Referring to FIG. 6, the data formatter 122 of FIG. 5 is shown. The data formatter 122 includes a header data generator 502, an ECC check byte generator 503, a scrambler 504, a modulator 505, and a frame formatter 506.

The header generator 502 is connected to the data source 120 (FIG. 5), which may be a magnetic disk drive, for receiving the original information data as the user data UD therefrom. The head data generator 502 adds the 16-byte header HD and the 16-byte subcode data SC to the beginning of each 2048-byte user data UD to produce the 2080 bytes of information data.

The ECC check byte generator 503 is connected to the header generator 502 for receiving the resulting 2080-byte information data HD, SC, and UD therefrom. The ECC check byte generator 503 generates 320 bytes of the ECC check byte CB, and adds this check byte CB to the 2080-byte information data. Thus, the frame data INF, corresponding to the data matrix of 20-byte rows by 120-byte columns of FIG. 4, for recording to one sector Sm are prepared.

The scrambler 504 is connected to the ECC check byte generator 503 for sequentially receiving the frame data INF from the beginning of the first column C1 of the data matrix of FIG. 4. The scrambler 504 effects randomization of the frame data INF by scrambling the 2048 bytes of user data UD and the 320 bytes of check byte CB with the exception of the 16 bytes of header HD and the 16 bytes of subcode SC data. Details of the scrambler 504 will be described soon later with reference to FIG. 7.

The modulator 505 is connected to the scrambler 504 for receiving thus randomized frame data INF therefrom. The modulator 505 modulates the randomized frame data INF using a known modulation method.

The frame formatter 506 is connected to the modulator 505 for receiving thus modulated and randomized frame data INF therefrom. The frame formatter 506 adds the 1-byte re-sync pattern RSf and 1-byte frame address FAf to the beginning of each 40-byte block of the modulated and randomized frame data INF input thereto. Furthermore, the frame formatter 506 appends the postamble PAf to the end of that 40-byte block.

Thus, both the header data HD, the subcode SC, the user data UD, and the ECC check byte CB are converted into the data suitable for recording on every frame FRf of recording sector Sm of the optical disk RC'. The frame formatter 506 is connected to the optical modulation driver 110 (FIG. 5) which drives the optical modulator 104b based on the frame data INFf therefrom.

Referring back to FIG. 5, the main controller 130 controls the recording apparatus WA to drive a blank disk RC' having a photoresist layer at a rotational velocity inversely proportional to the radial position to maintain a constant linear velocity (CLV), transports the optical head 104 at a moving velocity inversely proportional to the radial position to maintain a constant track pitch, and modulates the intensity of the optical beam emitted from an argon, krypton, or other laser light source according to the signal FRf input from the frame formatter 506 to record the signal to disk RC'.

Note an optical disk RC only for the record reproduction use is prepared as follows. After the recording surface covered by the photoresist is completely exposed to the laser light bearing the information, the disk is developed. Thus, the source disk having a developed photoresist layer bearing the information threat is produced.

A stamper is produced from this source disk by applying a nickel plating thereto. A plurality of resin disks each having a substrate of 0.6 mm thick, which are duplicates of the source disk, are from the stamper by utilizing an injection method. Then, suitable reflective material such as an aluminum alloy is spattered to the recording surface of the duplicated resin disk. Thus, the optical disks RC only for reproduction use are prepared. The reproduction from this type of optical disk RC will be described later with reference to FIG. 10.

The recording device may be of various known configurations, and further detailed description thereof is omitted for the sake of brevity. The recording carrier also may be various known configuration, and typical three types of optical disks are described briefly with reference to FIGS. 18A, 18B, and 18C.

Figure 18A:
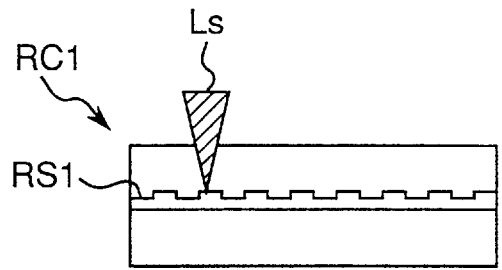
Figure 18B:
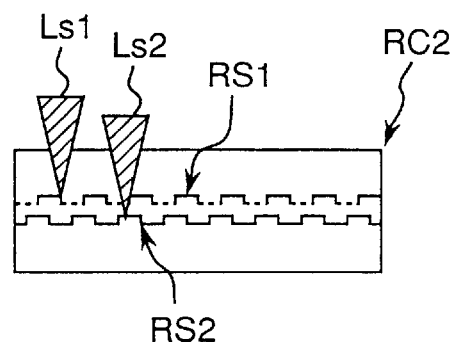
Figure 18C:
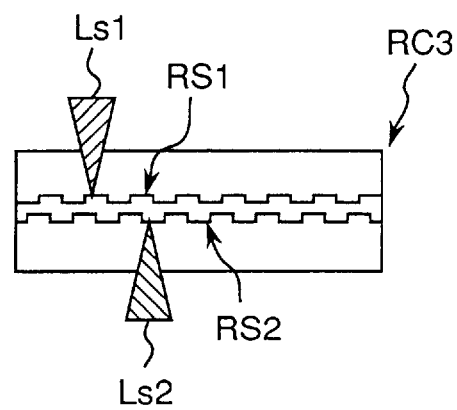

The optical disk RC1 in FIG. 18A has a single recording surface RS1 which is covered by a protection layer. The optical disk RC2 in FIG. 18B has two recording surfaces RS1 and RS2 disposed on the same side thereof. The optical disk RC3 has two recording surfaces RS1 and RS2 disposed on the opposite sides thereof.

Figure 7:
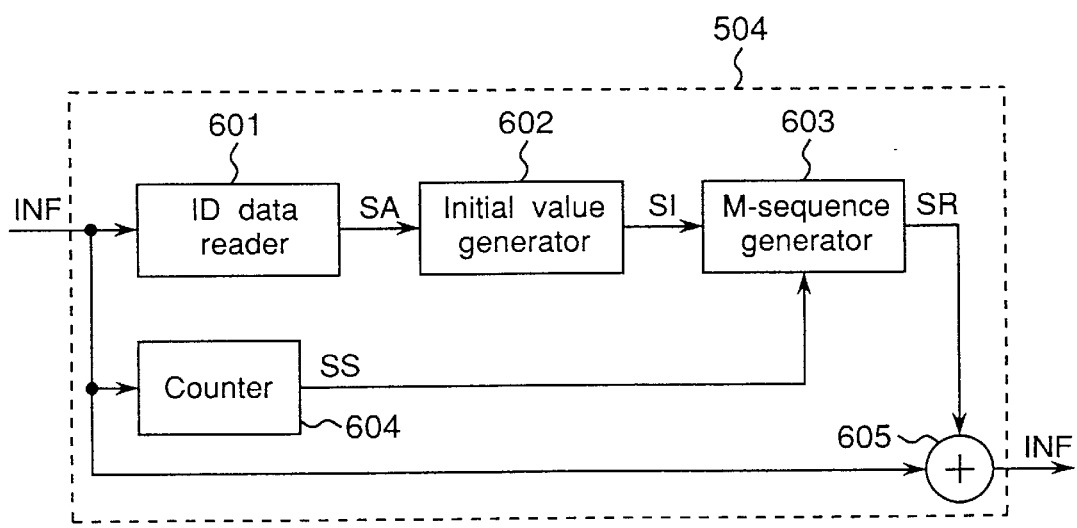
FIG. 7 is a block diagram showing the scrambler of FIG. 6.

Referring to FIG. 7, details of the scrambler 504 are shown. The scrambler 504 includes an ID data reader 601, an initial value generator 602, a maximum-length shift-register sequence (M-sequence) generator 603, a counter 604, and exclusive-OR operator 605 (a modulo-2 adder).

The ID data reader 601 is connected to the ECC check byte generator 503 (FIG. 6) for receiving the 2400 bytes of frame data INF therefrom. The ID data reader 601 reads the address data identifying the sector address from the header block WP and produces an address signal SA.

The initial value generator 602 is connected to the ID data reader 601 for receiving the address signal SA therefrom. The initial value generator 602 generates an initial value signal SI based on the address signal SA.

The M-sequence generator 603 is connected to the initial value generator 602 for receiving the initial value signal SI therefrom. Based on this initial value signal SI, the M-sequence generator 603 is set a predetermined operation state.

The counter 604 is connected to the ECC check byte generator 503 for receiving the frame data INF therefrom, and sequentially counts the byte, or length, of the currently receiving frame data INF. The counter 604 produces a level signal SS having two levels. The level signal SS becomes high when the first 32 bytes of frame data INF have been counted; and low when the next 2368 (2400–32) bytes of frame data INF have been counted. This means that the header and subcode block data and SC are already transmitted therein, and the next data is the beginning of the user data UD and ECC check byte CB of frame data to be scrambled. It is needless to say that the byte numbers 32 and 2368 are suitable determined according to the actual data format of the frame data to be scrambled.

The M-sequence generator 603 is also connected to the counter 604 for receiving that level signal SS therefrom. The M-sequence generator 603 outputs zero until receiving this level signal SS having the high level. Therefore, during receiving this high level signal SS, the M-sequence generator 603 continues to generate a randomized signal SR based on the initial value signal SI from the initial value generator 602. Then, on receipt of low level signal SS, the M-sequence generator 603 stops the generation of randomized signal and generates zero, as described in the above.

The exclusive-OR operator 605 is connected to the M-sequence generator 603 and the ECC check byte generator 503 for receiving the randomized (or zero value) signal SR and the frame data INF, respectively, therefrom. Since the exclusive-OR operator 605 makes an exclusive-OR operation with respect to the two signals INF and SR input thereto, the frame data INF is therefore not scrambled until the high level signal from the counter 604 is received. These unscrambled frame data INF which are the header and subcode SC are outputted from the exclusive-OR 605 to the modulator 505.

When the high level signal SS is received from the counter 604, the M-sequence generator 603 responds by generating a randomized signal SR based on the initial value SI supplied from the initial value generator 602. The exclusive-OR operator 605 then performs an exclusive-OR operation on the frame data INF and the randomized signal SR in 1-byte units, and outputs the result. In this view point, the level signal SS from the counter 604 is a scramble switching signal for instructing the scrambler 504 to start or stop the scrambling operation and to scramble only the desirable portion(s) of the data.

Figure 8:
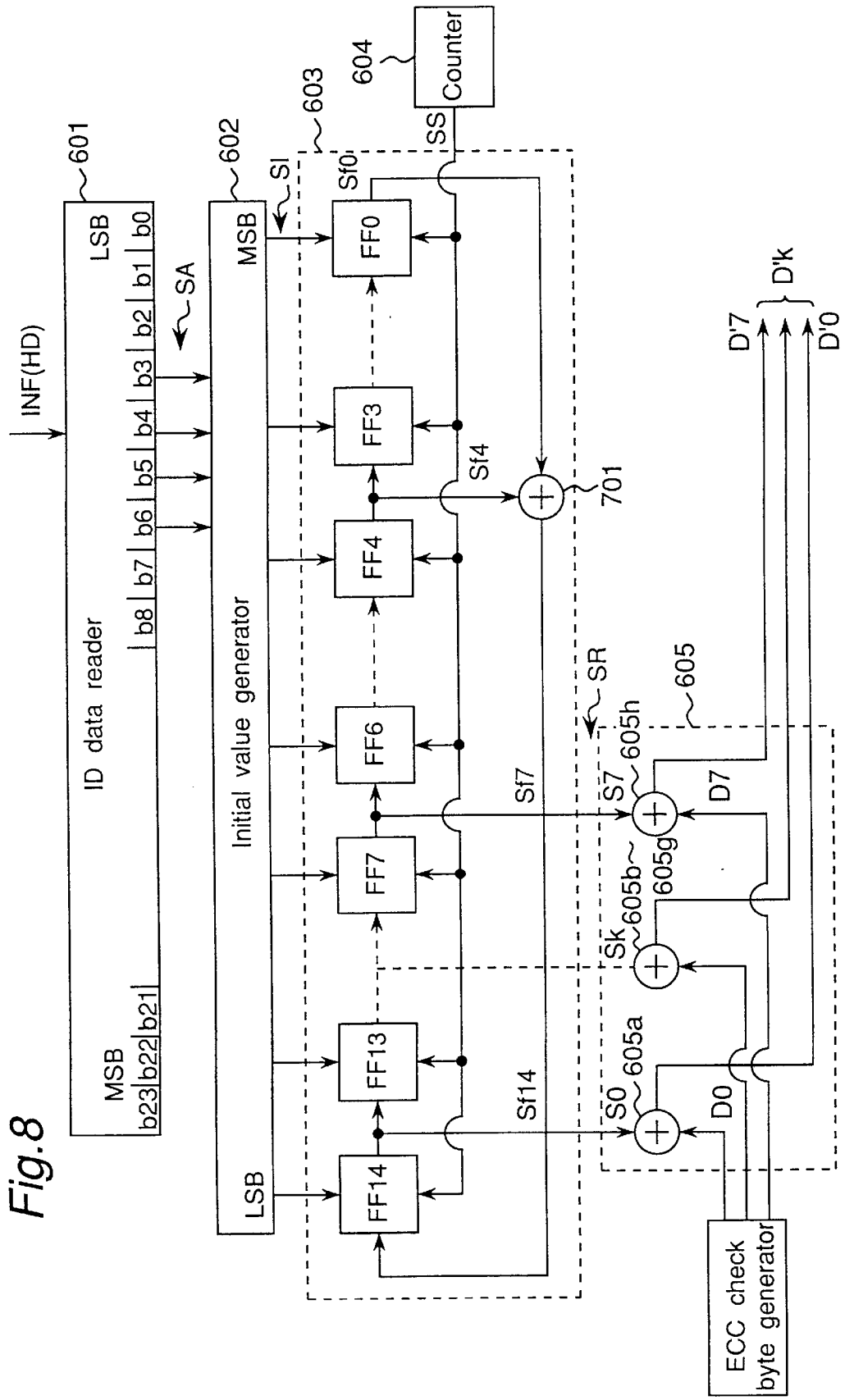
FIG. 8 is a block diagram showing the details of the scrambler of FIG. 7.

Referring to FIG. 8, the detailed structure of the M-sequence generator 603 together with the ID data reader 601, and the initial value generator 602, and the exclusive-OR operator 605 are shown. The ID data reader 601 includes twenty four of output ports b0 to b23 each for outputting the address data which are read from the header block HD. These twenty four of output ports b0 to b23 are sequentially arranged in the order starting from the least significant bit (LSB) to the most significant bit (MSB). In FIG. 8, the LSB (b0) and the MSB (b23) are located on the right and left ends of ID data reader 601.

The ID data reader 601 reads the address information which is one of the specific continuous sector numbers in the header data HD in the frame data INF from the ECC check byte generator 503. Then, the ID data reader 601 sends four bits from the fourth to seventh lowest order (b3–b6) of thus read address information as the address data SA to the initial value generator 602. Since the fourth lowest bit (b3) is incremented by eight, causing this address data SA to change (increase by one) at an interval of eight sectors.

The initial value generator 602 includes fifteen of output ports, not shown in FIG. 8 for the sake of brevity, each for outputting a single bit. These fifteen of output ports are sequentially arranged from the MSB to LSB. The initial value generator 602 thus generator an initial value data SI having 15-bits corresponding to this 4-bits of input address data SA which changes at an interval of eight sectors. Therefore, the fifteen bits of initial value SI changes every eight sectors according to the address data SA.

Although, in this embodiment, the address data SA and the initial value SI are changed, or renewed, at an interval of eight sectors, any other suitable numbers as a predetermined sector interval Y can be adopted for renewing both the data SA and value SI. This predetermined sector interval Y can be suitably determined according to the number of sectors Sm included each round of track TR, such that the address data SA is renewed at least one time per a round of track.

The M-sequence generator 603 is preferably configured in a form of shift register having a predetermined number X of stages. In this embodiment, the M-sequence generator 603 is preferably comprised of fifteen of flip-flops FF0 to FF14 forming a 15-bit shift register with feedback, wherein said predetermined number X is fifteen. The ninth to thirteenth flip-flops FF8 to FF12 are not shown in FIG. 8 for the sake of brevity. Each of flip-flops FF0 to FF14 is connected to the corresponding output ports of the initial value generator 602 for receiving a single bit data therefrom.

Note that the first order flip-flop FF0 and the fifteenth order flip-flop FF14 are connected to the MSB port and LSB port, respectively, of the initial value generator 602. These flip-flops FF0 to FF14 are also connected to the counter 604 for receiving the scramble switching signal SS therefrom. These flip-flops FF0 to FF14 make operations based on these input signals and outputs the operation result as signals Sf0 to Sf14, respectively, as shown in FIG. 8, wherein only signals Sf0, Sf4, and Sf14 are shown for the sake of brevity.

The M-sequence generator 603 further includes an exclusive-OR gate 701 having two input ports connected to the output ports of the flip-flops FF0 and FF4 for receiving the operation result signals Sf0 and Sf4, respectively, therefrom. The exclusive-OR gate 701 has an output port connected to the input port of the flip-flop FF14 for transferring its operation result with the two input signals Sf0 and Sf4 thereto.

When the scramble switching signal SS is received from the counter 604, each bit of the initial value SI from the initial value generator 602 is set to the corresponding flip-flops FF0 to FF14 of the M-sequence generator 603. The M-sequence generator 603 thus generates a randomized signal SR based on this initial value SI.

The exclusive-OR operator 605 includes eight of exclusive-OR gates 605a to 605h arrayed from the left to the right side in FIG. 8, wherein the exclusive-OR gates 605b to 605g are illustrated as only one gate for the sake of brevity. The exclusive-Or gate 605a is connected to the output port of the flip-flop FF14 for receiving the result signal Sf14 as a bit signal S0 therefrom. Similarly, other exclusive-OR gates 605b, 605c, 605d, 605e, 605f, 605g, and 605h are connected to the output ports of seven flip-flops FF13, FF12, FF11, FF10, FF9, FF8, and FF7, respectively; and receive the signals Sf13, Sf12, Sf11, Sf10, Sf9, Sf8, and Sf7 as bit signals S1, S2, S3, S4, S5, S6, and S7, respectively, therefrom.

Thus, these eight bits S0 to S7 of the randomized signal generated by the M-sequence generator 603 are supplied to the exclusive-OR operator 605 as the randomized signal SR. This randomized signal SR can be expressed by the following equation of $$SR = Sk \quad (1),$$

wherein "k" is an integer within a range from 0 to 7.

These eight of the exclusive-OR gates 605a to 605h are also connected to the output ports of the ECC check byte generator 503 for receiving a single bit data D0 to D7 of the user data UD, respectively, therefrom, resulting in the 8-bit (1-byte) randomized data. Thus, eight bits (one byte) data D0 to D7 from the ECC check byte generator 503 is sequentially sent to the exclusive-OR operator 605 byte by byte, as one byte user data Dk. The one byte user data DK can be expressed by the following equation of $$UD\ (1\text{-byte}) = Dk \quad (2),$$

wherein "k" is the same parameter as in the equation (1).

The first exclusive-OR gates 605a performs a bit by bit exclusive-OR operation on the flip-flop output bit S0 and the data bit D0, and outputs a single bit result as a scrambled bit D'0. Similarly, each of other exclusive-OR gates 605b to 605h performs a bit by bit exclusive-OR operation on the flip-flop output bits S2 to S7 and the output bits D1–D7 from the ECC check byte generator 503, and outputs the 7-bit scrambled bits D'1 to D'7, respectively. As a result, the exclusive-OR operator 605 performs a bit by bit exclusive-OR operation on the flip-flop output bits Sf14 (S0) to Sf7 (S7) and the eight bits D0 to D7 outputted from the ECC check byte generator 530, and outputs the 8-bit (one byte) of result data D'0 to D'7.

More specifically, the exclusive-OR operator 605 obtains the exclusive-OR of the initial value SI set to the M-sequence generator 603 and the first 1-byte data Dk inputted from the ECC check byte generator 503. Then, the exclusive-OR operator 605 shifts the shift register comprised of fifteen flip-flops FF0–FF14 of the M-sequence generator 603 by one bit; and obtains the exclusive-OR of said one-bit-shifted initial value SI and the second 1-byte data Dk input from the ECC check byte generator 503.

Thereafter, each time the shift register comprised of flip-flops FF0–FF14 is shifted one bit, the exclusive-OR operator 605 again obtains the exclusive-OR of said one-bit-shifted initial value SI and the next 1-byte data from the ECC check byte generator 503. Thus, the one byte scrambled data D'k outputted from the exclusive-OR operator 605 can be expressed by the following equation of $$D'k = Dk \oplus Sk \quad (3),$$

wherein "k" is the same as that in equations (1) and (2), and "$\oplus$" is a symbol of the exclusive-OR operator.

Note that the M-sequence generator 603 shown in FIG. 8 is a type of shift-register sequence generator, also known as a maximum-length shift-register sequence generator, and the sequence outputted by this generator is referred to as a "maximum-length sequence," or simply "M-sequence." The generative polynomial of M-sequence generator 603 is the 15-order, and is expressed by the following equation of $$H(X) = X^{15} + X^4 + 1 \quad (4).$$

The M-sequence generator 603 has a 15-stage shift register, resulting in an output sequence with a period of length $Lp = 2^{15} - 1$, or 32767 bits. It is to be noted that the exclusive-OR of the randomized data SK and the 1-byte of scrambled frame data Dk is obtained each time when the shift register comprised of flip-flops FF0–FF14 is shifted by one bit, as described in the above. Therefore, complete randomization of up to 32767 byes is possible by using this M-sequence generator with a period of length Lp=32767 bits.

The method of setting the initial value SI is described below. The sector length is approximately 6.1 mm, when the record carrier RC' has a diameter of 120 mm, a data track region from 25 mm to 58 mm measured on the radius, a linear density of 0.3 µm/bit, and a sector length of 2530 bytes in view of the data length. In this case, there are approximately 26 sectors at the inside circumference, and approximately 60 sectors at the outside circumference, of the data region of the record carrier RC'.

The initial value generator 602 changes the initial value SI according to the values SA of the fourth to seventh lower four bits (b3–b6) of the address read by the ID data reader 601 as described with reference to FIG. 8. Therefore, the initial value SI changes every eight sectors. In this view points, the recording track Tr can be divided into plural regions each having eight sectors wherein the same vale of initial value SI is applied, as best shown in FIG. 1.

An example of the initial value SI suitable for scrambled data generation is shown in Table 1 below.

TABLE 1

| ID.D<br>b3–b6 | I.V.G<br>SI |
|---|---|
| 0h | 0001h |
| 1h | 5500h |
| 2h | 0002h |
| 3h | 2A00h |
| 4h | 0004h |
| 5h | 5400h |
| 6h | 0008h |
| 7h | 2800h |
| 8h | 0010h |
| 9h | 5000h |
| 0Ah | 0020h |
| 0Bh | 2001h |
| 0Ch | 0040h |
| 0Dh | 4002h |
| 0Eh | 0080h |
| 0Fh | 0005h |

The table 1 is comprised of two, left half and right half, portions. The left half portion includes two major columns titled as "ID.D." and "I.V.G." at the upper row, respectively. "ID.D" and "I.V.G." mean the ID data reader 601 and the initial value generator 602.

The "ID.D" column is also titled as "b3–b6" in the lower row and indicates the value SA, in the hexadecimal system, which is outputted from the ports b3 to b6 of the ID data reader 601. The "I.V.G." column is also titles as "SI" in the lower row and indicates the initial value SI (in the hexadecimal system) corresponding to the values from the ID data reader 601 indicated in the left column. The right half portion of table 1 is the substantially the same as the left half portion.

In this example, the initial value in each cell of "SI" columns is set to the top number of each group of numbers which is generated by equally dividing the summation of the M-sequence generator's period and one by sixteen. Specifically, the distance between the initial values of 0001h and 5500h is 2048 (32768/16) bits. In other words, 2048 bytes of data can be randomized.

Since the initial value SI changes according to the values SA of the fourth to seventh lower four bits (b3–b6) of the address read by the ID data reader 601, the initial value SI changes at an interval of eight sectors (every eight sectors).

Therefore, even if the same data is recorded, it will be randomized across 128 (16×8) sectors. Furthermore, the correlation between signals recorded on adjacent or neighboring tracks will be extremely low because the maximum number of sectors per revolution of the record carrier RC' in this example is sixty sectors.

According to this example, the header and subcode data HD and SC is, as described above, not scrambled. Therefore, a strong correlation may exist between the 32-byte header HD, subcode data SC, re-sync pattern data RS and postamble data PA recorded to adjacent tracks in the radial direction. However, the length of the recording areas for this data HD and SC is less than 100 µm, and there is therefore no practical problem. Note that the header HD is not scrambled because it cannot be unscrambled during reproduction if the initial value is not known.

The subcode data SC is also not scrambled because the subcode data SC records the type of data, e.g., audio or video data, and this data is preferably readable without requiring descrambling. It is thus possible to scramble the subcode data SC with the only side-effect being the increased time required for descrambling when reading the subcode data SC.

As described in the above with reference to the Table 1, to 2048 bytes of data can be scrambled with one initial value SI. Since the data to be scrambled is 2368 (2400−32) bytes per sector according to this example, the 320 (2368−2048) bytes of the data INF is scrambled with the same randomized signal SR from the M-sequence generator 603.

However, as the length of the 320 bytes data is 768 µm (320 byte×8×0.3), there is no practical problem. Furthermore, the optical disk RC' has approximately twenty six sectors, more than twice of eight sectors, at the most inside circumference. Therefore, when the value of 0001h is set as the initial value SI for the first region R1, the values of 5500h and 0002h are set for the next regions R2 and R3, respectively. This apparently means that these three continual regions R1, R2, and R3 are never located beside other regions with respect to the radial direction of the optical disk RC', and ensures that there is no possibility of the correlation of signals reproduced from adjacent tracks.

Figure 19:
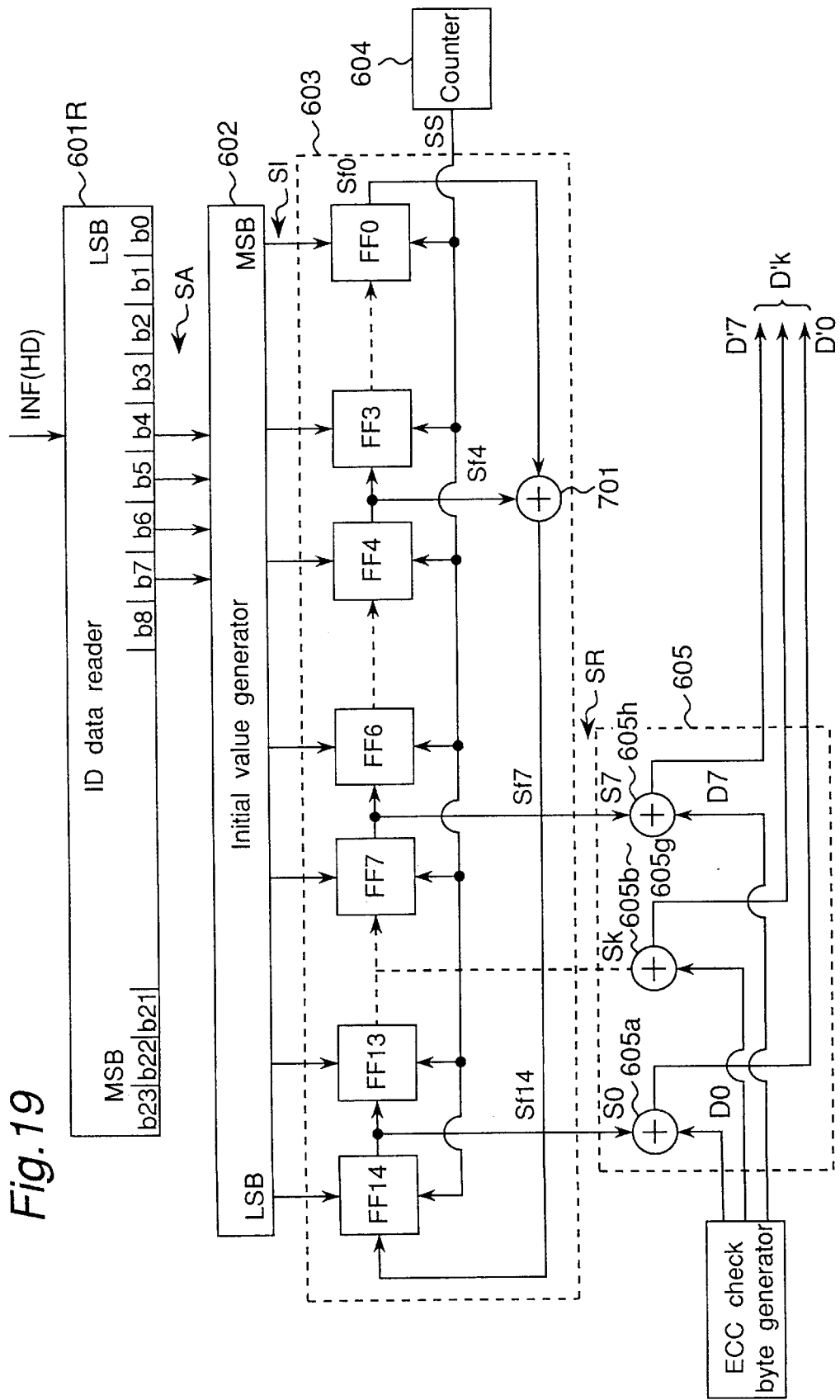
FIG. 19 is a block diagram similar to FIG. 8, but showing an alternative of scrambler of FIG. 7.

Referring to FIG. 19, an alternative ID data reader 601R, very similar to the ID data reader 601 of FIG. 8, incorporated in the scrambler 504 is shown. The ID data reader 601R sends four bits from not the fourth to seventh but the fifth to eight lowest order (b4–b7) of thus read address information as the address data SA to the initial value generator 602. The fifth lowest bit (b4) is incremented by sixteen (16) causing this address data SA to change (increase by one) at an interval of sixteen sectors. Therefore, the fifteen bits of initial value SI changes every sixteen sectors according to the address data SA.

The initial value SI can be set in the same manner as described above with reference to the table 1 as the output from the ports b4 to b7. However, since the initial value SI changes at an interval of sixteen sectors (every sixteen sectors), the data to be recorded will be randomized across 256 (16×16) sectors. The operation of descrambling data scrambled with respect to the address data SA (b4 to b7) will be described later with reference to FIG. 20.

Figure 9:
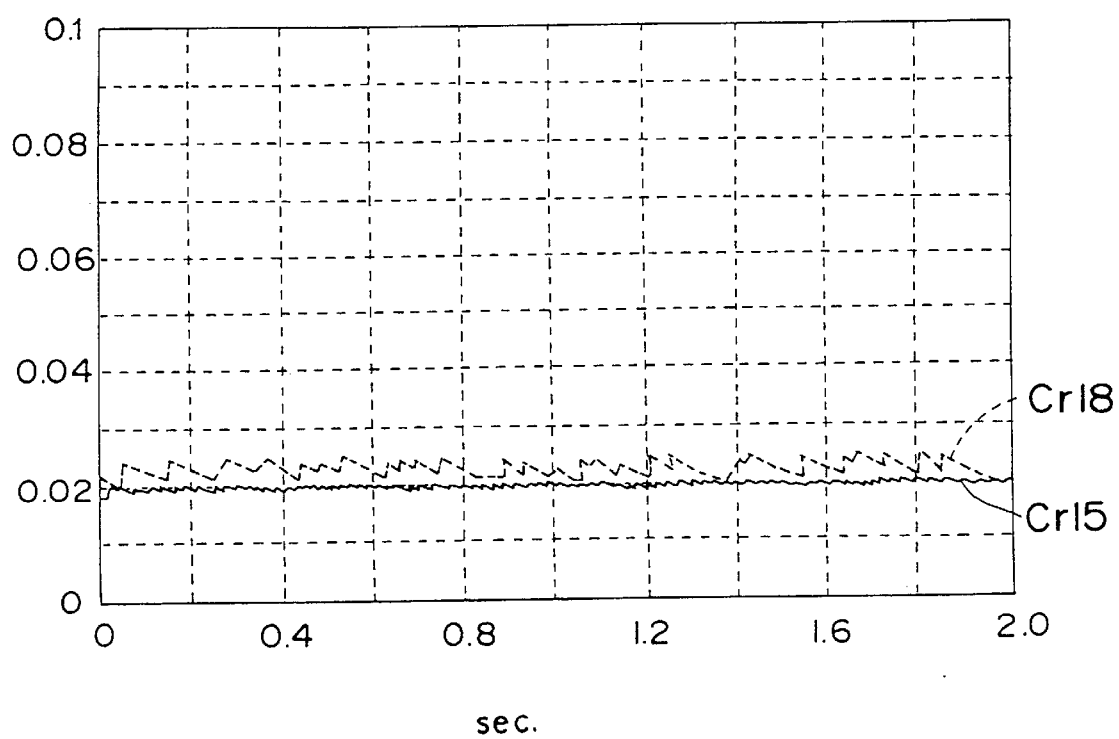
FIG. 9 is a graph in assistance of explaining the correlation reduction of signals scrambled with the randomized numbers generated by the M-sequence generator of FIG. 19.

Referring to FIG. 9, a simulation result of correlation of signals scrambled with the randomized numbers SR generated by the M-sequence generator 603 is shown. Note that the ID data reader 601R of FIG. 19 is used for supplying the address SA to the initial value generator 602. In FIG. 9, a solid line Cr15 and a dot line Cr18 indicated the simulated correction from the signals randomized with the 15-stage shift register and the 18-stage shift register, respectively.

These result are obtained by a computer simulation performed under the following conditions. The zero value data is recorded as the user data UDf. The initial value SI is set to be renewed at an interval of sixteen sectors.

Specifically, when the randomized signal by the M-sequence generator is shifted by Δn byte between the target track currently scanned by a light beam and the neighboring track, it is presumed that Δn gradually varies from 1 to $2^{15}-2$. In this situation, one byte data of the scanned track and the neighboring track is compared. When both the data are the same, "one" is set, otherwise "zero" is set as the result of every comparison.

Based on the above comparison result, the correlation between the signals in neighboring tracks can be expressed by the following equation of $$S(t) = \sum_{i=1}^{M} \sum_{j=1}^{M} \delta(M(i-1)+j)\tau \cdot \text{if } (R(j) = R(i+j)), \quad (5)$$

wherein $M=2^{15}-2$; "δ" represents delta function; and "τ" represents the period for one byte length when the transmission rate is 1.8 megabyte/second.

In FIG. 9, the value of S(t) is filtered through a low pass filter having a cut-off frequency of 2 kHz, and is held at its peak value. Each peak value thus held are plotted with respect to the vertical axis representing held peak values and the horizontal axis representing corresponding time. Note that the time constant for peak holding is set to 0.55 second.

The period of the M-sequence generator having 15 stage sift register is $(2^{15}-1)$ bits: and the period of the M-sequence generator having 18 stage shift register is $(2^{18}-1)$. Therefore, when the initial value SI is renewed every sixteen sectors (at an interval of sixteen sectors), almost all period of the 15-stage of M-sequence system are used. However, only one-eighths of the period of the 18-stage of M-sequence system are used.

As typically shown in FIG. 9, wherein the solid line Cr15 having less the 15-stage resistor is much smaller than the dot line Cr18 having the 18-stage resistor over the entire period range. Note the lines Cr15 and Cr18 correspond to the 15-stage shift register and the 18-stage shift register, respectively. Thus, according to the present invention, the M-sequence generator having less number of shift resistors can reduce the signal correlation more effectively than that having more shift resistors, and also can be made in a compact size. This signal correlation reducing effect is also obtained even when the ID data reader 601R is replaced by the ID data reader 601 which will renew the randomized number SR (address SA) every eight sectors.

Figure 10:
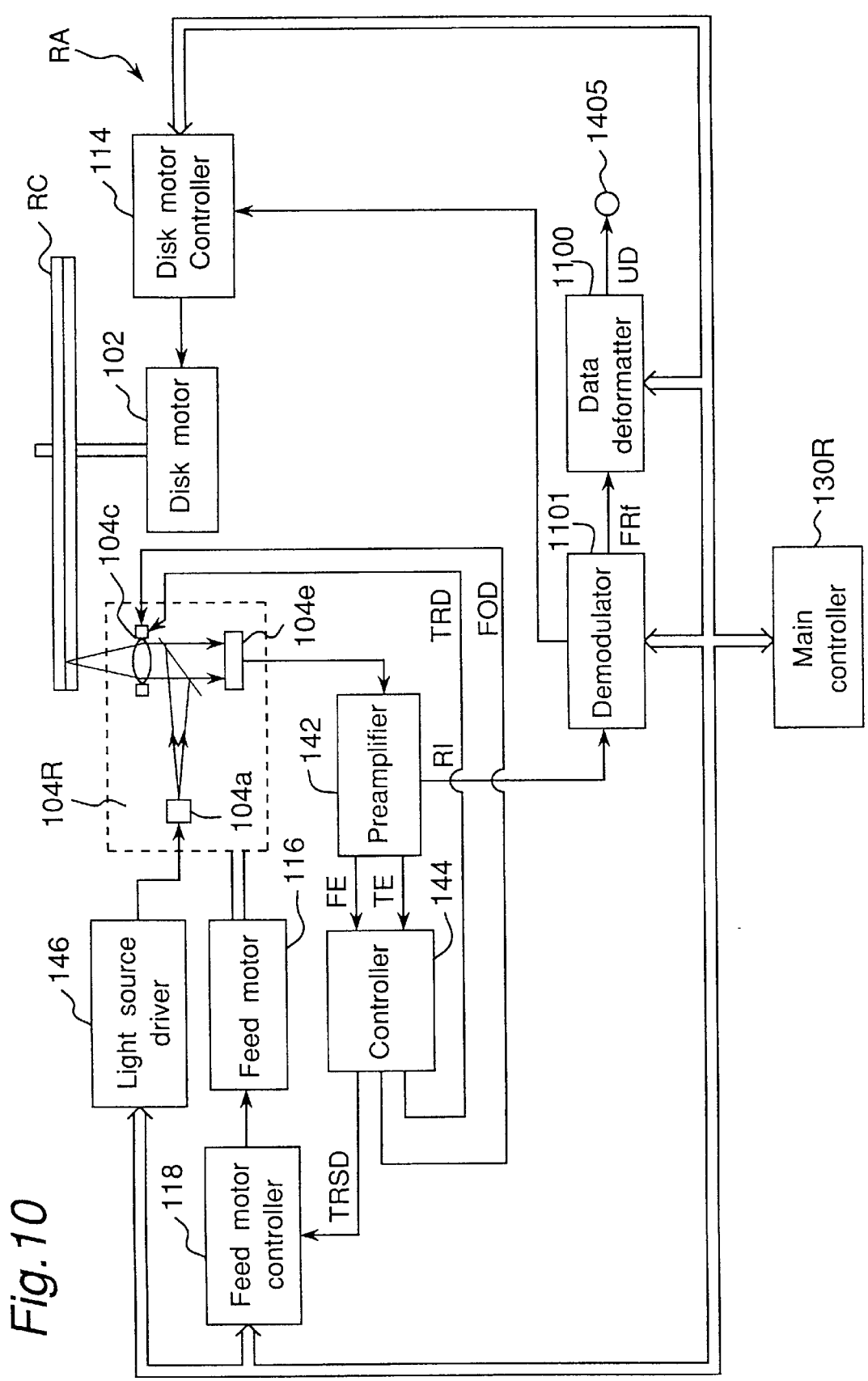
FIG. 10 is a block diagram showing a reproducing apparatus according to the present invention for reproducing the randomized data from the optical disk of FIG. 1.

Referring to FIG. 10, a reproducing apparatus for reproducing the randomized data from the optical disk RC of FIG. 1 is shown. The reproducing apparatus RA includes the disk motor 102, the disk motor controller 114, the feed motor 116, and the feed motor controller 118 that are substantially the same as those of the recording apparatus WA of FIG. 5.

The reproducing apparatus RA further includes an optical head 104R and a main controller 130R having constructions and functions very similar to those of the optical head 104 and the main controller 130 of FIG. 5. A light source driver 146 connected to the main controller 130R is provided for controlling the operation of the light source 104a.

A preamplifier 142 is connected to the photo detector 104e for receiving the pilot signals Sc1, Sc2, Sc3, and Sc4, and Sc4 therefrom. The preamplifier 142 amplifies these pilot signals and produces a focus error signal FE, a tracking error signal TE, and a reproduced information signal.

A controller 144 is connected to the preamplifier 142 for receiving the focus and tracking error signals FE and TE therefrom to produce a focus control signal FRD, a tracking control signal TRD, and an optical head driving signal TRSD.

The feed motor controller 118 is further connected to the controller 144 for receiving the optical head driving signal TRSD therefrom. Based on this signal TRSD, the feed motor controller 118 drives the feed motor 116 to position the optical head 104R correctly.

The optical head 104R is further connected to the controller 144 for receiving the focus control signal FOD and the tracking control signal TRD therefrom. Based on these signals FOD and TRD, the optical head 104R controls the light beam Ls to be focused and tracked on the aimed position of the optical disk RC.

A demodulator 1101 is connected to the preamplifier 142 for receiving the reproduced information signal therefrom to demodulate thereof to extract the scrambled signal FRf recorded on the optical disk RC'. The disk motor controller 114 is further connected to the demodulator 1101 for receiving the reproduced signal therefrom to produce the disk motor control signal by measuring the intervals between thus reproduced signals.

A deformatter 1100 is connected to the demodulator 1101 for receiving the demodulated data FRf therefrom to perform the error correction and descrambling operation to reproduced original user data UD. An output port 1405 is connected to the deformatter 1100 for supplying thus reproduced original user data UD to external devices such as a personal computer therethrough.

Figure 11:
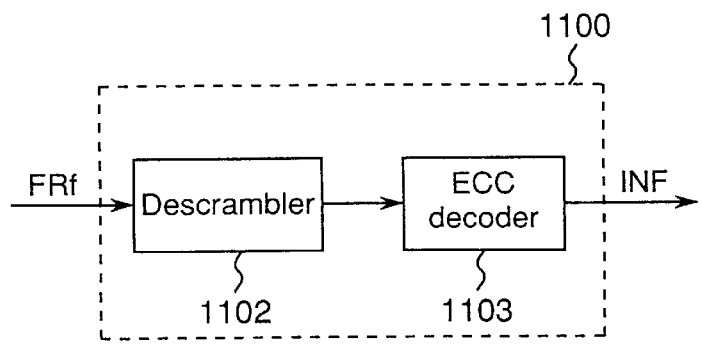
FIG. 11 is a block diagram showing a data deformatter of FIG. 10.

Referring to FIG. 11 the deformatter 1100 of FIG. 10 is shown. The deformatter 1100 includes a descrambler 1102 and an ECC decoder 1103. The descrambler 1102 is connected to the demodulator 1101 (FIG. 12) for receiving the demodulated data FRf which is comprised of not scrambled 32-byte header HD and subcode SC, and the scrambled user data UD and check byte CB therefrom.

The descrambler 1102 reads the address from the unscrambled header data HD, and descrambles the scrambled user data UD and check byte CB. Thus, the descrambled data UD and CB with the header HD and subcode SC is obtained.

The ECC decoder 1103 is connected to the descrambler 1102 for receiving the non scrambled data with check byte CB to performs the error correction thereof. Thus, the original frame data INF with no error is reproduced.

Figure 12:
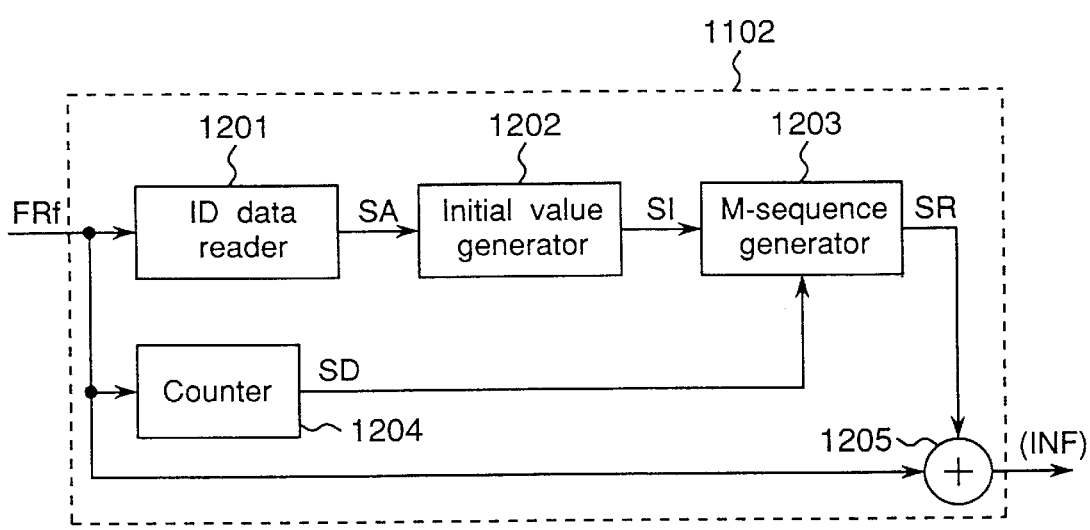
FIG. 12 is a block diagram showing the descrambler of FIG. 11.

Referring to FIG. 12, the descrambler 1102 is shown. The descrambler 1102 has substantially the same construction, including an ID data reader 1201, an initial value generator 1202, an M-sequence generator 1203, a counter 1204, and an exclusive-OR operator 1205, as that of the scrambler 504 of FIG. 7.

In operation, the ID data reader 1201 reads the address number from the demodulated signal input from the demodulator 1101, and outputs the address SA to the initial value generator 1202. The initial value generator 1202 generates the initial value SI based on the address number SA, and presets the initial value SI in the M-sequence generator 1203.

The counter 1204 counts the data length input from the demodulator 1101, and outputs a level signal having two levels as a descramble switching signal SD to the M-sequence generator 1203. The descramble switching signal SD is the substantially the same as the scrambling switching signal. Therefore, the descramble switch signal SD becomes high when receiving of the first 32 bytes from the beginning of the sector is completed, and low when the next 2368 (2400−32) bytes of frame data INF have been counted.

The M-sequence generator 1203 outputs zero until this end signal is received. The data outputted from the demodulator 1101 is therefore not descrambled until the descramble start signal Sd is received, and is thus outputted from the exclusive-OR operator 1205 without being descrambled.

When the end signal Sd is received from the counter 1204, the M-sequence generator 1203 responds by generating a randomized signal based on the initial value SI supplied from the initial value generator 1202. The exclusive-OR operator 1205 then performs an exclusive-OR operation on the signals supplied from the demodulator 1101 and the M-sequence generator 1203 in 1-byte units, and outputs the result.

Figure 13:
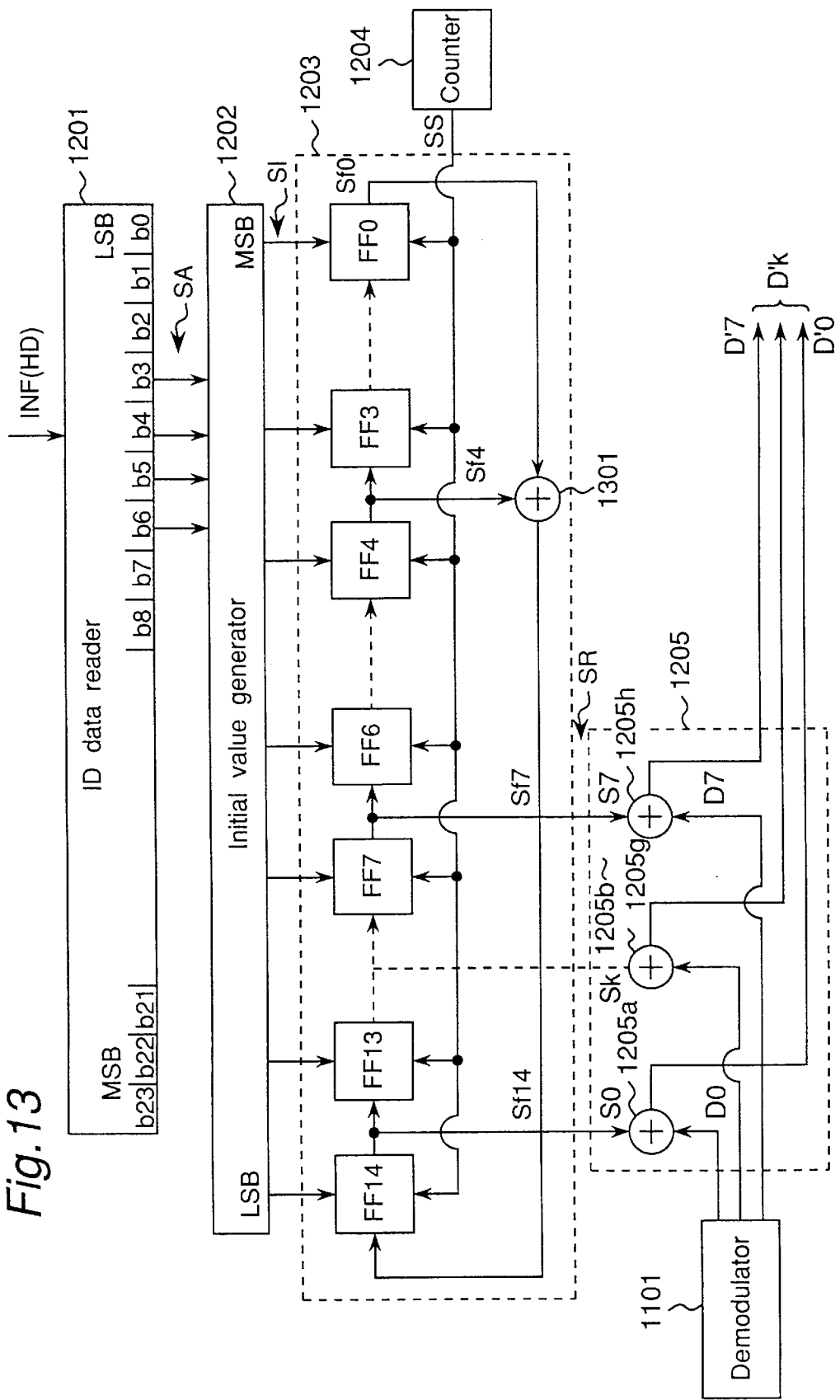
FIG. 13 is a block diagram showing details of the descrambler of FIG. 12.

Referring to FIG. 13, the M-sequence generator 1203 used for descrambling operation is shown. The M-sequence generator 1203 is essentially identical to the M-sequence generator 603 shown in FIG. 8. Specifically, the exclusive-OR of the outputs from flip-flops FF0 and FF4 is obtained by an exclusive-OR gate 1301, which inputs the result to an flip-flop FF14. Needless to say that the ID data reader 1201, the initial value generator 1202, the exclusive-OR operator 1205 are also substantially identical to the corresponding components shown in FIG. 8. Note that the exclusive-OR operator 1205 includes eight of exclusive-OR gates 1205a to 1205h.

The ID data reader 1201 reads the address, and sends the values of the fourth to seventh lower bits (b3–b6) SA to the initial value generator 1202, which generates an initial value SI corresponding to this value. When the end signal SD is received from the counter 1204, the initial value SI from the initial value generator 1202 is set to each of the flip-flops FF0–FF14 forming the M-sequence generator 1203.

Thus, according to this embodiment, addresses can be read by demodulation and descrambling. Therefore, high speed searching when reading data from the record carrier RC is thus possible with the scrambling method described with reference to FIG. 7. However, the initial value SI is unknown when the address cannot be read, and descrambling is therefore not possible. Therefore, high reliability reading of the address is necessary. It may be difficult to read all addresses, however, due to signal dropout or simply dust and foreign matter on the record carrier surface.

A recording apparatus and a reproducing apparatus which can read address accurately, scramble and descramble reliably, even when there is signal dropout or dust and foreign matter on the record carrier surface is described below.

Figure 20:
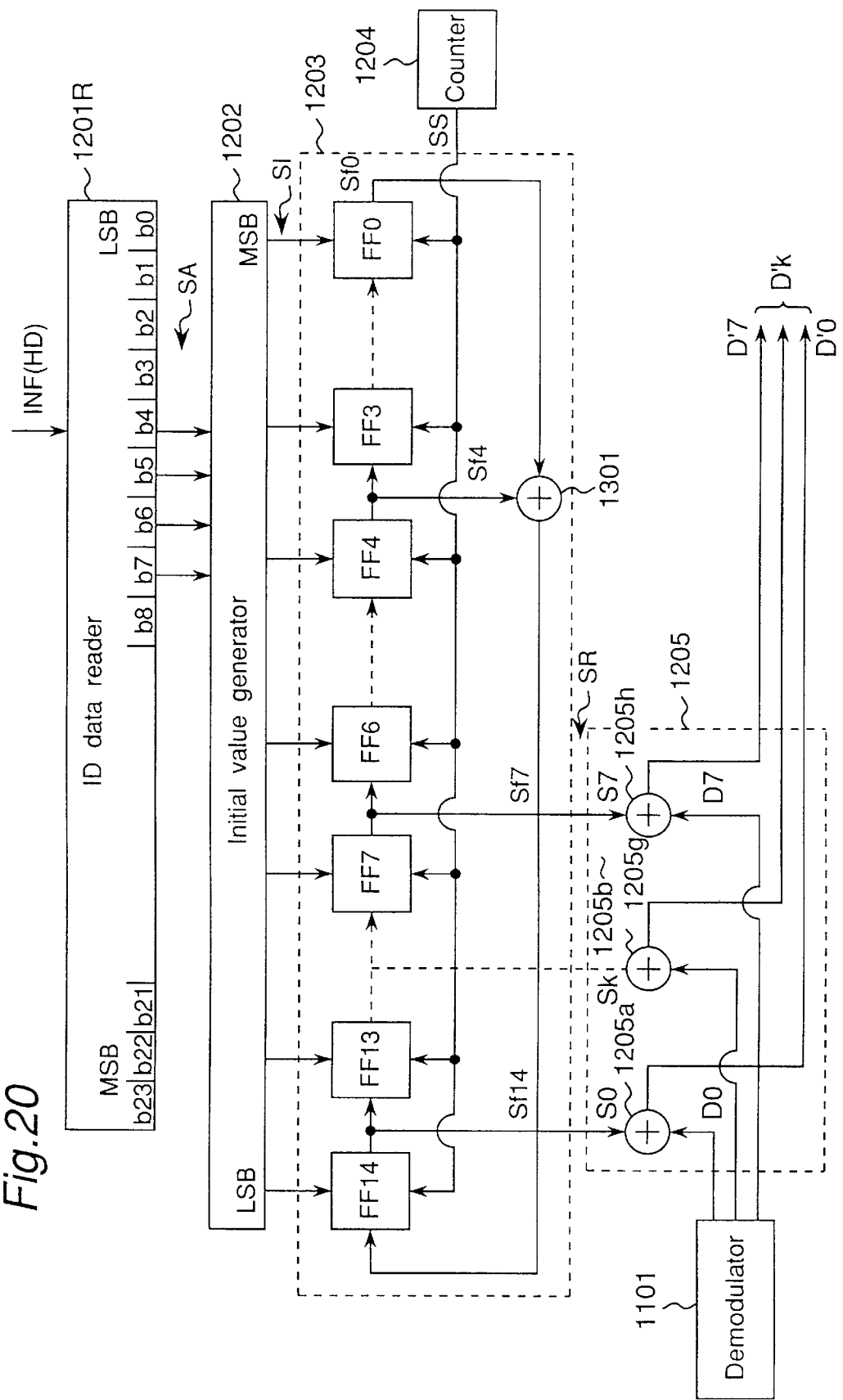
FIG. 20 is a block diagram similar to FIG. 13, but showing an alternative of descrambler of FIG. 12.

Referring to FIG. 20, an alternative ID data reader 1201R, very similar to the ID data reader 1201 of FIG. 13, is shown. This ID data reader 1201R is incorporated in the descrambler 1102 for descrambling the data which is descrambled by the scrambler 504 incorporated with the ID reader 601R of FIG. 19. The descrambling operation, hereafter, is the same as those in the descrambler 1102 described with reference to FIGS. 12 and 13.

Second Embodiment

Figure 14:
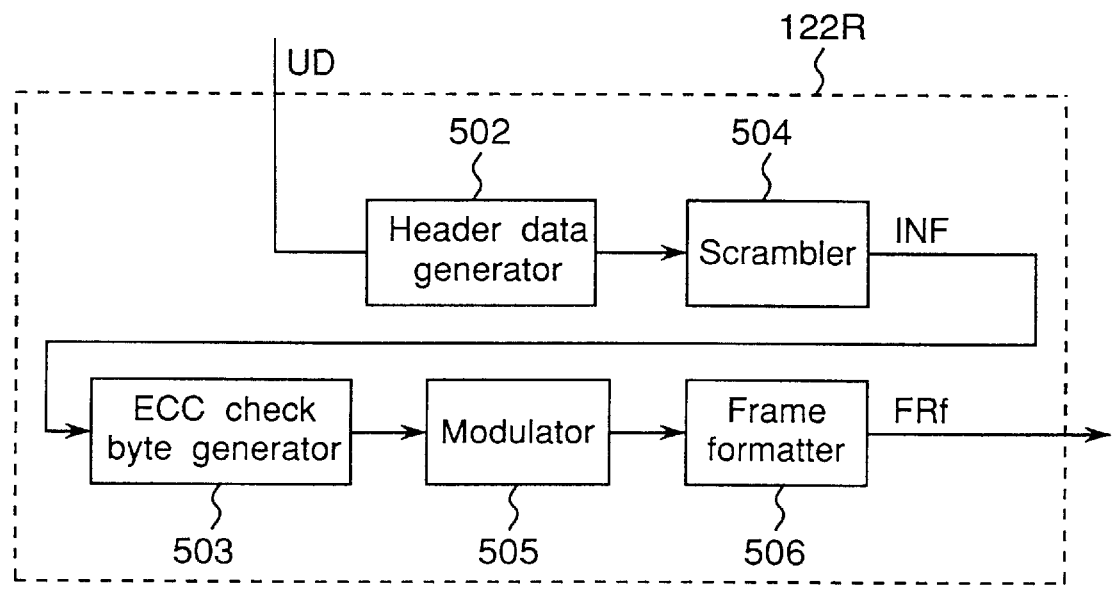
FIG. 14 is a block diagram showing an alternative of the scrambler of FIG. 6.
Figure 15:
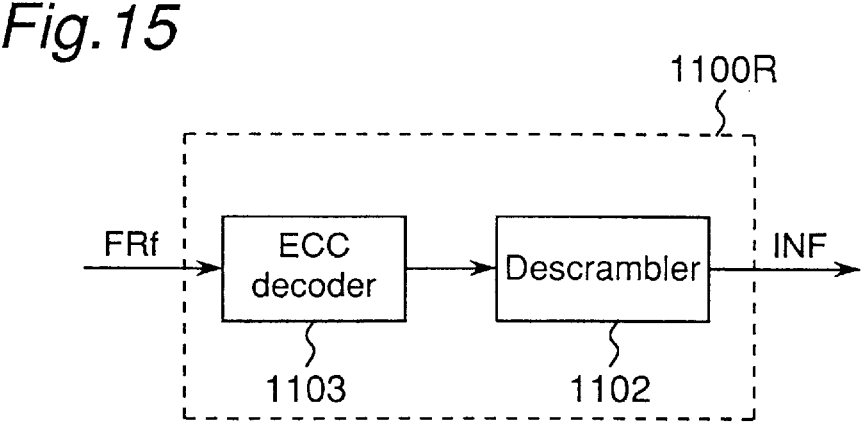
FIG. 15 is a block diagram showing an alternative of the descrambler of FIG. 11.

With reference to FIGS. 14 and 15, a recording apparatus and a reproducing apparatus according to this embodiment are described. Note that the recording apparatus WA and the reproducing apparatus RA according to this embodiment are different from those of the first embodiment only in the data formatter and the data deformatter, respectively. Therefore, any detailed description for the apparatuses other than the formatter and the deformatter is omitted for the sake of brevity.

Referring to FIG. 14, an alternative of the data formatter 122 of FIG. 6 is shown. The alternative data formatter 122R, according to this embodiment, includes the same components of those in the data formatter 122, but the ECC check byte generator 503 and the scrambler 504 are replaced by each other. Specifically, in this data formatter 122R, the ECC check byte generator 503 is connected to the scrambler 504 that is connected to the header data generator 502, as best shown in FIG. 9.

As a result of this mutual replacement of components 503 and 504, the operation by this formatter 122R is different from that of the formatter 122 in the following points. However, only 2048 bytes of user data UD passing through the header data generator 502 is scrambled by the scrambler 504 by substantially the same method which is previously described with reference to FIGS. 7 and 8. Note that the scramble switching signal SS becomes high when the first 32 bytes of frame data INF have been counted; and low when the next 2048 (2080–32) bytes of frame data INF have been counted in this embodiment.

After scrambling by the scrambler 504, the ECC check byte generator 503 generates and adds the 320 bytes of ECC check byte CB to thus scrambled 2048-byte user data. This 2048-byte scrambled data with the 320 byte of non-scrambled check byte CB will be processed by the modulator 505 and the frame formatter 506 in substantially the same manner as that in the data formatter 122. However, the descramble switch signal SD becomes high when receiving of the first 32 bytes from the beginning of the sector is completed, and low when the next 2048 (2400–320–32) bytes of frame data INF have been counted.

Referring to FIG. 15, an alternative of the data formatter 1100 of FIG. 11 is shown. The alternative data deformatter 1100R, according to this embodiment, includes the same components of those in the data deformatter 1100, but the descrambler 1102 and the ECC decoder 1103 are replaced by each other. Specifically, in this data deformatter 1100R, the descrambler 1102 is connected to the ECC decoder 1103 that is connected to the demodulator 1101, as shown in FIG. 10.

The ECC decoder 1103 receives the demodulated data comprised of not scrambled 32-byte header HD and subcode SC, scrambled user data UD, and non scrambled 320-byte check byte CB. The ECC decoder 1103 applies the error correction to the reproduced data from the preamplifier 142 by using the non scrambled 320-byte check byte CB. Thus, 2048-bye error corrected data HD, SC, and UD are obtained.

The descrambler 1102 reads the address from the error-corrected unscrambled header data HD, and descrambles the error-corrected scrambled user data UD only. Thus, the descrambled data UD with the header HD, subcode SC, and check byte CB free from the descrambling is obtained.

Specifically, the read signal is first demodulated, the error correction code is decoded, and the address is then read; descrambling is then applied based on the read address.

As described above, errors resulting from signal dropout or similar factors are corrected because the address is read after ECC decoding. As a result, the addresses can be read with excellent reliability, and the signal can be reliably descrambled, although somewhat more time is required to read the address when compared with the first embodiment described above. Because the error correction code CB is added after the data is scrambled, the ECC check byte CB shown is not scrambled but is also randomized because the data block is randomized. It is therefore possible to shorten the length of the M-sequence period, and the M-sequence generator can be simplified.

Although the initial value SI for the M-sequence generator is renewed, or changed, every eight sectors in the above described embodiments, it is needless to say that the initial value SI can be renewed every sixteen sectors. More specifically, this renewal interval is set to any suitable value corresponding to said predetermined sector interval number Y, so that the initial value SI is changed more than one time at the most inside recording track.

The preceding embodiments have been described with reference to constant linear velocity (CLV) recording whereby the record carrier is driven at an equivalent peripheral speed for data recording, but the present invention shall not be thus limited.

For example, the invention is also compatible with constant angular velocity (CAV) recording whereby the record carrier is driven at an equivalent angular velocity, and zone-CAV (ZCAV) whereby the record carrier is divided into plural zones and data is recorded so that the data density is essentially constant at the inside circumference track of each zone. In general, the address is recorded with a combination of track numbers and sector numbers where one track is one circumference of the record carrier, track numbers are assigned sequentially in the radial direction, and sector numbers are assigned sequentially in the circumferential direction of the record carrier. In this case the sectors are arrayed in the radial direction, and the initial values are determined according to the track numbers. If the randomized signal is generated based on these initial values, the signal correlation between adjacent tracks can be reduced.

It is also possible to determine the initial value for scrambling according to the sector number and the least-significant bit of the track number. In addition, if the initial value is determined from the least-significant bit of the track number and the least-significant bit of the sector number, the m-sequence period can be shortened, and the m-sequence generator can be accordingly simplified. Specifically, a first initial value is selected for sectors with an even sector number and a second initial value is selected for sectors with an odd sector number when the least-significant bit of the track number is zero; when the least-significant bit of the track number is one, the second initial value is selected for sectors with an even sector number and the first initial value is selected for sectors with an odd sector number. Because the sectors are arrayed in the radial direction, the initial value of the M-sequence will essentially differ according to the sector of adjacent tracks, and any signal correlation is reduced by sector unit. It is therefore possible to use two initial values and shorten the period of the m-sequence.

It is also not necessary to change the initial value of the m-sequence generator every eight sectors, and the initial value may be changed every sector or every sixteen sectors. Specifically, insofar as the initial value is changed by a unit less than the number of sectors recorded to the track at the inside circumference of the record carrier, the correlation between identical data recorded to adjacent tracks will be reduced.

The invention shall also not be limited to using an m-sequence generator, and any device capable of generating a randomized signal according to predefined rules for a given initial value can be used.

Using a maximum-length sequence generator extremely simple construction, the present invention thus randomizes the information to be recorded based on the value of identification information identifying the sector location to which the information is recorded. The correlation between signals on adjacent tracks is therefore reduced, and the effects of crosstalk are also randomized, thus reducing the effect on the track error signal, and enabling extremely stable tracking control. Jitter in the reproduction signal is also randomized because crosstalk from adjacent tracks is randomized, and jitter in the phase locked loop (PLL) used during signal reproduction is also reduced.

The low frequency component of the reproduction signal is reduced, and digitalization during signal reproduction is also simplified, when the same data is recorded across plural sectors because the data is randomized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described i connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

Industrial Applicability

The prevent invention can be applicable an optical record carrier for recording information with a very high density, wherein the correlation between signals reproduced from neighboring tracks are inevitable. According to the present invention, since each of neighboring tracks is recorded with the information which is randomized in different pattern, no correlation between signals in those tracks even when the original information to be recorded is the same such as "zero" information.

Thus, the user can record the various kinds of information on the optical record carrier with a very high density and reproduced thus recorded information free from the mutual correlation such as crosstalk and jitter.

We claim:

1. An optical record carrier having recorded information thereon, comprising:

a recording track formed thereon in one of a spiral pattern and a concentric pattern; and a plurality of sectors formed on said recording track for recording said recorded information and sector information identifying a location for each recorded sector, wherein said plurality of sectors having information adapted to be recorded thereon after being randomized using a value generated by a maximum-length sequence generation method with a predetermined number of stages with respect to an initial value renewed at least once per revolution of said recording track.

2. The optical record carrier of claim 1, wherein said optical record carrier includes said recorded information and said sector information recorded on said plurality of sectors.

3. The optical record carrier of claim 1, wherein said predetermined number of stages is based upon a data quantity of said information recorded on said plurality of sectors.

4. The optical record carrier of claim 1, wherein said predetermined number of stages is not less than fifteen.

5. The optical record carrier of claim 1, wherein said initial value is renewed at an interval related to a series of a predetermined number of sectors.

6. The optical record carrier of claim 5, wherein said predetermined number of sectors is not less than eight.

7. The optical record carrier of claim 5, wherein said predetermined number of sectors is equal to sixteen.

8. A method for recording information on a recording track having a plurality of sectors, the recording track being formed on an optical record carrier in one of a spiral pattern and a concentric pattern, said method comprising:

receiving information suitable for recording to said sectors as a plurality of information units;

producing sector information indicative of a location of a sector for recording each of said plurality of information units;

generating an initial value based on said sector information;

generating a random number, based on each initial value generated, utilizing a maximum-length sequence code generator having a predetermined number of stages; and scrambling the information with the random number.

9. The method of claim 8, further comprising renewing the initial value at least once per revolution of said track.

10. The method of claim 8, further comprising renewing the sector information at an interval related to a series of a predetermined number of sectors.

11. The method of claim 10, wherein the predetermined number of sectors is not less than eight.

12. The method of claim 10, wherein the predetermined number of sectors is equal to sixteen.

13. The method of claim 8, wherein the predetermined number of stages is not less than 15.

14. An apparatus for recording information on a recording track having a plurality of sectors formed on an optical record carrier, said recording track being formed in one of a spiral pattern and a concentric pattern, comprising:

an information unit device that produces information units suitable for recording to said plurality of sectors;

a sector information device that produces sector information indicating the location of said sector for recording each said information unit;

an initial value generator that produces an initial value based on said sector information; and a scrambler that scrambles said information unit with a random number generated based upon said initial value, utilizing a maximum-length sequence generation method with a predetermined number of stages determined according to a quantity of said information unit.

15. The apparatus of claim 14, wherein said predetermined number of stages is not less than fifteen.

16. The apparatus of claim 14, wherein said initial value is renewed at least once per revolution of said recording track.

17. The apparatus of claim 14, wherein said sector information is renewed at an interval related to a series of a predetermined number of sectors.

18. The apparatus of claim 17, wherein said predetermined number of sectors is not less than eight.

19. The apparatus of claim 17, wherein said predetermined number of sectors is sixteen.

20. A method for reproducing information from a recording track of an optical record carrier, the recording track having a plurality of sectors, the information being recorded together with sector information indicative of locations of respective sectors of the plurality of sectors, the information being recorded to the optical record carrier in one of a spiral pattern and a concentric pattern, the information being scrambled with a random number generated by a maximum-length sequence code generator having a predetermined number of stages with respect to an initial value, the initial value being renewed at least once per revolution of the recording track, the method comprising:

reproducing said sector information and scrambled information from said sector;

generating an initial value based upon said reproduced sector information;

generating a random number based upon said initial value, said initial value utilizing a maximum-length sequence code; and descrambling said reproduced scrambled information with said generated random number.

21. The method of claim 20, further comprising renewing the sector information at an interval related to a series of a predetermined number of sectors.

22. The method of claim 21, wherein the predetermined number of sectors is not less than eight.

23. The method of claim 21, wherein the predetermined number of sectors is sixteen.

24. The method of claim 20, wherein the predetermined number of stages is not less than fifteen.

25. An apparatus for reproducing information from a recording track of an optical record carrier, said track having a plurality of sectors, said information being recorded together with sector information indicative of locations of respective sectors of said plurality of the sectors, said information being recorded in one of a spiral pattern and a concentric pattern on said optical record carrier, said information being randomized with a random number generated by a maximum-length generator having a predetermined number of stages with respect to an initial value generated and renewed at least once per revolution of said recording track, based on said sector information, said apparatus comprising:

a reproducing device that reproduces said sector information and scrambled information from said sector;

an initial value generator that generates said initial value based upon said reproduced sector information;

a generator that generates said random number based upon said generated initial value utilizing a maximum-length sequence generation method which is the same as the method used for recording said information; and a descrambler that descrambles said reproduced scrambled information with said generated random number.

26. The apparatus of claim 25, wherein said sector information is renewed at an interval related to a series of a predetermined number of sectors.

27. The apparatus of claim 26, wherein said predetermined number of sectors is not less than eight.

28. The apparatus of claim 26, wherein said predetermined number of sectors is sixteen.

29. The apparatus of claim 25, wherein said predetermined number of stages is not less than fifteen.

* * * * *

UNITED STATES PATENT AND TRADEMARK OFFICE
CERTIFICATE OF CORRECTION

PATENT NO.    : 5,867,475
DATED         : February 2, 1999
INVENTOR(S)   : Moriya et al.

It is certified that error appears in the above-identified patent and that said Letters Patent is hereby corrected as shown below:

Title page,
Section [30], "Foreign Application Priority Data",
change "Oct. 4, 1995" to -- Apr. 10, 1995 --.

Section [56], "References Cited", "FOREIGN PATENT DOCUMENTS"
change "0655793" to -- 0655739 --.

Signed and Sealed this

Eleventh Day of September, 2001

*Attest:*

*Attesting Officer*

NICHOLAS P. GODICI
*Acting Director of the United States Patent and Trademark Office*